United States Patent
Busse

(10) Patent No.: US 7,552,697 B2
(45) Date of Patent: *Jun. 30, 2009

(54) DEVICE FOR FEEDING POULTRY ESPECIALLY FATTENED POULTRY, PREFERABLY BROILERS

(75) Inventor: Roland Busse, Cloppenburg (DE)

(73) Assignee: Big Dutchman International GmbH, Vechta (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/500,078

(22) PCT Filed: Dec. 6, 2002

(86) PCT No.: PCT/DE02/04475

§ 371 (c)(1),
(2), (4) Date: Nov. 26, 2004

(87) PCT Pub. No.: WO03/055299

PCT Pub. Date: Jul. 10, 2003

(65) Prior Publication Data

US 2005/0072365 A1  Apr. 7, 2005

(30) Foreign Application Priority Data

Dec. 24, 2001  (DE) ................................. 101 64 122

(51) Int. Cl.
*A01K 61/02* (2006.01)
(52) U.S. Cl. ..................... 119/53; 119/52.1; 119/52.4; 119/57.5; 119/57.7
(58) Field of Classification Search ............... 119/57.7, 119/52.1, 56.1, 52.3, 52.4, 53, 53.5, 54, 57, 119/57.91
See application file for complete search history.

(56) References Cited

U.S. PATENT DOCUMENTS

| 2,808,029 | A | 10/1957 | Geerlings |
| 2,842,096 | A | 7/1958 | Bradfield |
| 2,884,899 | A | 5/1959 | Jackes et al. |
| 3,102,511 | A | 9/1963 | Atcheson |
| 3,215,252 | A | 11/1965 | Wilkes |

(Continued)

FOREIGN PATENT DOCUMENTS

EP  0105571  6/1989

(Continued)

*Primary Examiner*—Michael R Mansen
*Assistant Examiner*—Joshua J Michener
(74) *Attorney, Agent, or Firm*—Price, Heneveld, Cooper, DeWitt & Litton, LLP

(57) ABSTRACT

A device for the feeding of poultry including a bowl device comprising a feed bowl, a cupola suspending the feed bowl, and a downpipe. The feed bowl is located beneath the downpipe and the cupola is formed from grid bars. The downpipe comprises an inner cylinder and an outer cylinder encompassing the inner cylinder. The outer cylinder is guided in a rotatable, a raisable and a lowerable manner on the inner cylinder. The bowl device includes at least one lifting stop for delimiting a lifting and lowering path of the bowl. The outer cylinder and the inner cylinder is comprised in each case of adjacent cylinder sections co-axial to each other, whereby face peripheral areas of the cylinder sections turned towards each other are connected to one another by bridging elements which bridge a gap area which corresponds to an interval distance between the cylinder sections.

66 Claims, 10 Drawing Sheets

U.S. PATENT DOCUMENTS

| | | | |
|---|---|---|---|
| 3,388,690 A * | 6/1968 | Hostetler | 119/53 |
| 3,511,215 A | 5/1970 | Myers | |
| 3,811,412 A * | 5/1974 | Murto et al. | 119/53 |
| 3,911,868 A | 10/1975 | Brembeck | |
| 4,070,990 A | 1/1978 | Swartzendruber | |
| 4,216,742 A | 8/1980 | Kirchhofer | |
| 4,348,988 A * | 9/1982 | Lawson | 119/53 |
| 4,401,057 A * | 8/1983 | Van Gilst | 119/57.4 |
| 4,476,811 A * | 10/1984 | Swartzendruber | 119/57.4 |
| 4,527,513 A * | 7/1985 | Hart et al. | 119/51.5 |
| 4,552,095 A * | 11/1985 | Segalla | 119/53 |
| 4,676,197 A * | 6/1987 | Hoover | 119/57.4 |
| 4,995,343 A * | 2/1991 | Cole et al. | 119/53 |
| 5,007,380 A | 4/1991 | Badia et al. | 119/53 |
| 5,092,274 A * | 3/1992 | Cole et al. | 119/57.4 |
| 5,097,797 A * | 3/1992 | Van Zee et al. | 119/57.4 |
| 5,101,765 A | 4/1992 | Manfrin | |
| 5,101,766 A * | 4/1992 | Runion | 119/53 |
| 5,113,797 A * | 5/1992 | van Daele | 119/53 |
| 5,275,131 A | 1/1994 | Brake et al. | |
| 5,311,839 A | 5/1994 | Pollock et al. | |
| 5,406,907 A * | 4/1995 | Hart | 119/53 |
| 5,435,267 A | 7/1995 | Patterson | |
| 5,462,017 A * | 10/1995 | Pollock et al. | 119/57.4 |
| 5,497,730 A * | 3/1996 | van Daele et al. | 119/53 |
| 5,603,285 A | 2/1997 | Kleinsasser | |
| 5,642,688 A | 7/1997 | Bannier et al. | |
| 5,718,187 A | 2/1998 | Pollock et al. | |
| 5,762,021 A * | 6/1998 | Horwood et al. | 119/57.4 |
| 5,765,503 A * | 6/1998 | van Daele | 119/52.4 |
| 5,778,821 A * | 7/1998 | Horwood et al. | 119/53 |
| 5,794,562 A * | 8/1998 | Hart | 119/52.4 |
| 5,875,733 A * | 3/1999 | Chen | 119/57.4 |
| 5,884,581 A * | 3/1999 | Vandaele | 119/52.4 |
| 5,927,232 A * | 7/1999 | Pollock | 119/53 |
| 5,941,193 A | 8/1999 | Cole | |
| 5,957,083 A | 9/1999 | Cheng | |
| 5,964,185 A | 10/1999 | DeBonne et al. | |
| 5,967,083 A | 10/1999 | Kleinsasser | |
| 6,050,220 A * | 4/2000 | Kimmel et al. | 119/53 |
| 6,152,078 A | 11/2000 | Romeu Guardia | |
| 6,173,676 B1 * | 1/2001 | Cole | 119/57.4 |
| 6,470,826 B2 * | 10/2002 | Thuline | 119/52.4 |
| 6,655,317 B1 * | 12/2003 | Steudler et al. | 119/53 |
| 6,779,488 B2 * | 8/2004 | Corti et al. | 119/57.4 |

FOREIGN PATENT DOCUMENTS

| | | |
|---|---|---|
| EP | 0421553 | 4/1991 |
| EP | 1145631 | 10/2001 |
| FR | 1129736 | 1/1957 |
| FR | 2483652 | 12/1981 |
| GB | 1022509 | 3/1966 |
| GB | 2080663 | 2/1982 |

* cited by examiner

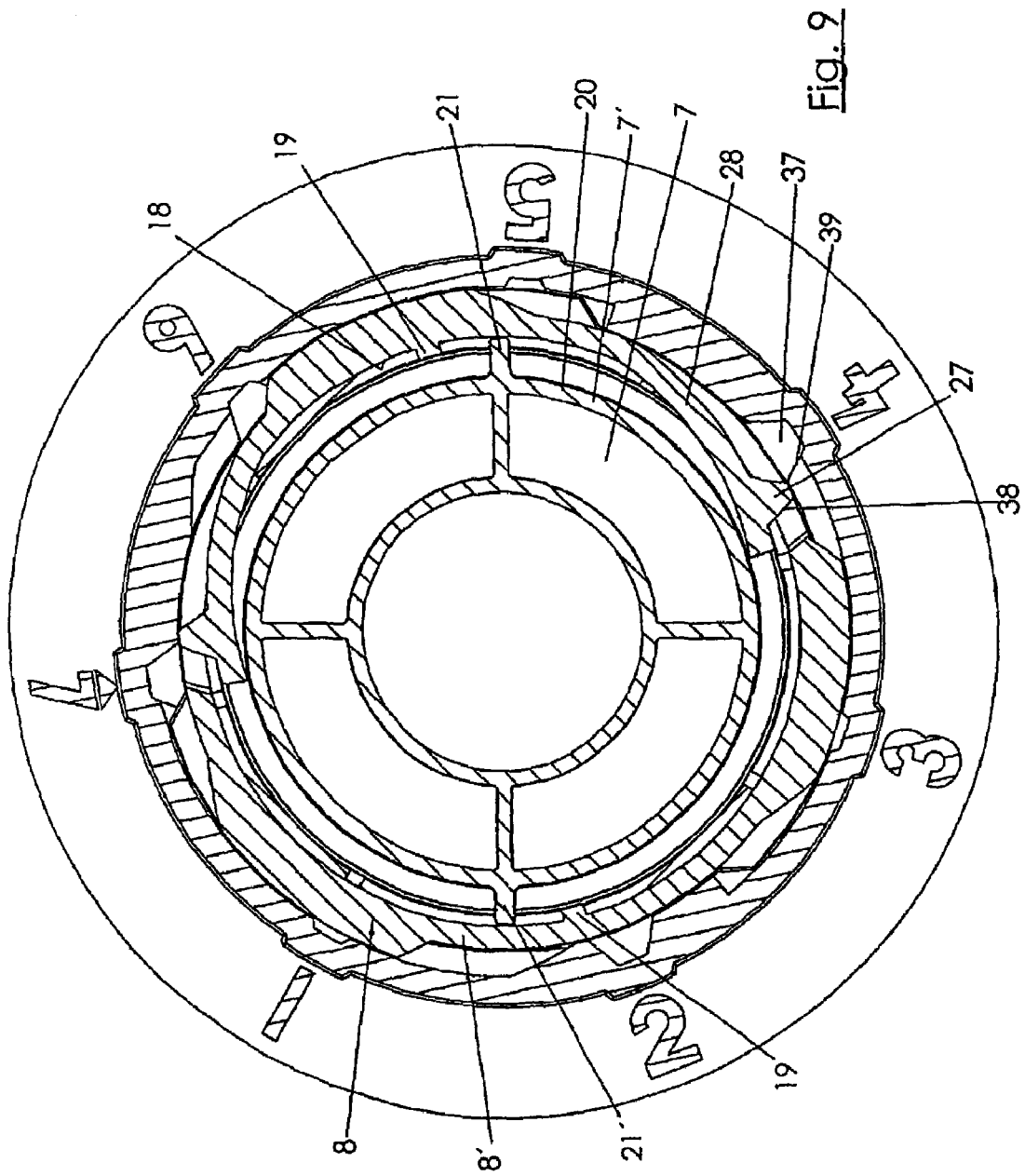

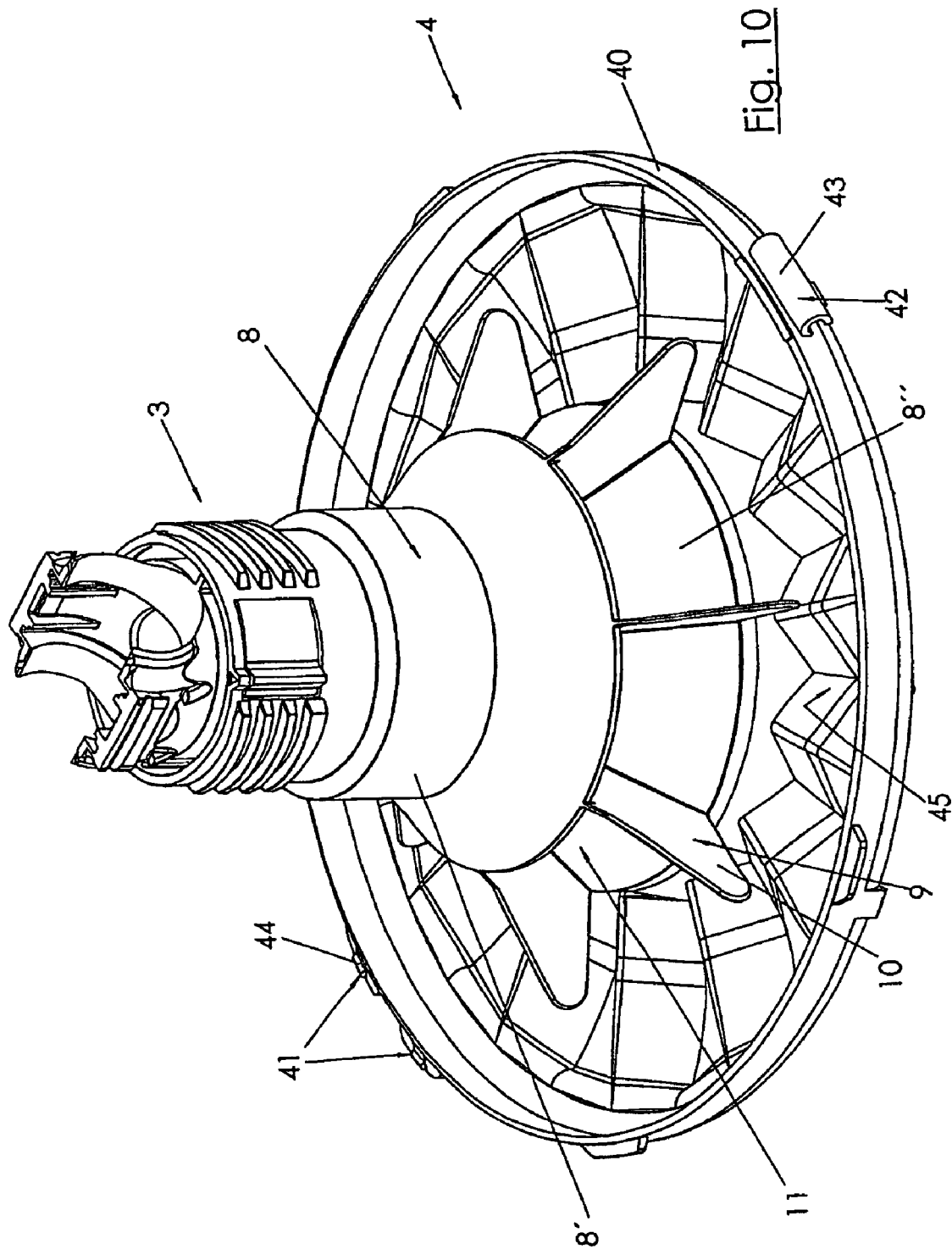

DEVICE FOR FEEDING POULTRY ESPECIALLY FATTENED POULTRY, PREFERABLY BROILERS

CROSS-REFERENCE TO RELATED APPLICATION

This application claims priority to German Application 101 64 122.2 entitled DEVICE FOR THE FEEDING OF POULTRY, FATTENED POULTRY IN PARTICULAR, AND ESPECIALLY BROILERS, which was filed on Dec. 24, 2001.

BACKGROUND OF THE INVENTION

The invention relates to a device for the feeding of free-range poultry kept in coops, fattening poultry in particular, and especially broilers, with at least one feed delivery pipe held above the floor of the coop in a raisable and lowerable manner. The feed delivery pipe has a series of branch apertures, of which each is allocated to a bowl device suspended on the delivery pipe, which features a downpipe descending from the branch aperture and a feed bowl located beneath the delivery pipe. Bowl cupolas are formed from grid bard running in spoke fashion, whereby the downpipe consists of an inner cylinder departing from the branch aperture and an outer cylinder surrounding the inner cylinder, to which the feed bowl is suspended by means of the grid bars of its bowl cupola in such a way that it comes to rest when the feed delivery pipe is lowered, coming to rest in particular on the floor of the coop. The outer cylinder is guided in relation to the inner cylinder so as to be rotatable as well as capable of being raised and lowered, and is provided with at least one raising stop delimiting the raising and lowering travel.

A device of the generic type referred to is shown in EP 0 105 571 B1.

When the feed bowl of the known device comes to rest with the lowering of the feed pipe, apertures in the downpipe can be cleared. As a result of this, depending on the individual position of the apertures in relation to the feed bowl, it is possible to allocate different discharge cones and discharge heights to the feed passing via the downpipe into the feed bowl. In order, for example, to provide chicks with improved eating conditions, a higher discharge height and therefore a high feed level to the bowl is necessary, which can be achieved by clearing further apertures in the downpipe with the known device. In accordance with the growth of the chicks, the feed level in the bowl can also be set lower because growing animals can easily reach areas located lower in the feed bowls than chicks are capable of for the purpose of acquiring feed.

Devices installed in a coop should be as free of maintenance as possible. Accordingly, the most uniform refill of the feed is desired, while still remaining free of interruption, in predetermined metering volumes in each case into each individual feed bowl. With the known device, however, interruptions may arise in that feed emerges irregularly from the downpipe into the feed bowls, as a result, for example, of the corresponding outlet apertures becoming closed in the casing surface of the downpipe. This is the case in particular with feed which is prone to form bridges, for example with feed with poor sprinkle behavior.

In addition to this, the outer pipe is capable of rotating in relation to the inner pipe, as a result of which the cross-section of an additional outlet aperture in the downpipe is reduced, because an aperture in the outer cylinder is no longer congruent, or only partially, with the aperture allocated to it in the inner cylinder.

Feed bowls should be cleaned at regular intervals. This is effected by spraying with water, at least after a fattening period, before the coop is occupied by new chicks. During the spraying process, it is advantageous for the feed bowl to be capable of rotation about the longitudinal axis of the fall pipe deriving from the feed pipe, because in this situation practically all inner areas of the feed bowl run past a sharp water jet directed from one side into the feed bowl. While the possibility of the feed bowl to rotate on the inner cylinder of the downpipe is still advantageous for cleaning, it is nevertheless disadvantageous, for the reasons described heretofore, for keeping clear the additional apertures in the downpipe. A further disadvantage of the free rotation of the feed bowl lies in the fact that a predetermined distance interval between the feed bowl and the free end of the downpipe, on which the feed level desired in each case is dependent, may be unintentionally wrongly adjusted due to the rotational movement during cleaning.

SUMMARY OF THE INVENTION

The invention is based on the problem of avoiding these disadvantages by means of a device for the feeding of poultry, as described in the Background of the Invention.

With the device according to the invention, both the outer cylinder and the inner cylinder consist in each case of cylinder sections adjacent to one another and coaxial to one another, whereby the face periphery areas of the cylinder sections, turned towards one another, are connected to one another by means of bridging elements, which bridge a gap area which corresponds to the distance interval between the cylinder sections.

It has been shown that, during a fattening period, with an initial feed level for chicks and another feed level for broilers, in the final analysis therefore with only two feed level positions in the feed bowl, adequate fattening results can be achieved, so that, with a subdivision of the inner cylinder and the outer cylinder into two cylinder sections in each case, a simple design is provided that has adequate operational reliability.

The gap interval between two cylinder sections of the inner cylinder or the outer cylinder respectively forms an additional aperture for the emergence of feed into the feed bowl, also referred to here as a "360° window," which is located next to the lower free end of the downpipe formed from the inner cylinder and outer cylinder. Each gap interval between the cylinder sections forms a free circumferential aperture, which is only interrupted by the bridge elements. These, however, without any losses in strength or stability needing to be taken into account, can be kept so thin that their thickness, and therefore their cross-section, reduces the free aperture width of the 360° window formed in a virtually imperceptible manner. Even with unfavorable circumstances, it is therefore possible to arrive at a situation with hardly any bridging formations or blockages in the area pertaining as the 360° window of the additional apertures in the casing of the downpipe or its cylinder respectively.

On the actuation of the delivery device installed in the feed delivery pipe, e.g. a dragline or a spiral feed device, it is guaranteed with the device designed according to the invention that each feed bowl will also be reliably filled up to the predetermined feed level. The risk will hardly arise any longer of individual feed bowls remaining empty, in particular in the critical initial stage of the fattening period for chicks which are still small, due to blockages in the area of the additional apertures in the downpipe.

The feed delivery pipe, usually running vertical and therefore parallel to the floor of the coop, can be moved perpendicularly, for example by means of traction cables capable of being centrally actuated. With the known device, this actuation makes it possible for the feed bowl to be brought into positions in which it rests either on the floor of the coop or is raised off of it. In the same manner as with the known device, the setting of the feed bowl on the floor of the coop is used to displace the outer cylinder vertically to the inner cylinder, and, by means of this displacement travel, to open an additional feed discharge aperture, namely the 360° circumferential window, in the downpipe. With this means of effect, comparable to the prior art, with the device according to the invention in a further embodiment, however, a situation is reached in which the end-side cylinder section covers the gap area between the cylinder sections of the outer cylinder when the outer cylinder is moved by means of a raising of the feed delivery pipe into a position which is lowered in relation to the inner cylinder, in which the lifting stops of the inner and outer cylinder are in mutually opposed positions. It can be seen that the formation of the 360° window has the advantage that, even in the ground resting position, in which the window is cleared, possible rotation of the feed bowl in relation to the inner cylinder which may arise will not have any disadvantageous effect on the feed outflow through the 360° window.

In order to prevent the possibility of the outer pipe with the feed bowl falling away from the inner cylinder when the feed delivery pipe is raised, at least one lifting stop is provided for. With the device according to the invention, a recess in the inner surface of the cylinder plays a part in the formation of the lifting stop of the outer cylinder, as well as at least one contact shoulder for the recess, projecting radially from the inner cylinder. If the inner cylinder is raised, in that the feed delivery pipe is brought into a greater distance interval from the floor of the coop, the inner cylinder initially slides in the outer cylinder as far as the contact shoulder projecting from the inner cylinder, against which the step formed by the recess in the outer cylinder comes in contact, so that, with the further raising of the inner cylinder, the outer cylinder and therefore the feed bowl connected to it can be drawn along together. In this position, therefore, the parts of the inner cylinder and the outer cylinder participating in the formation of the lifting stops are in a mutually-opposed position, and the end-side cylinder section of the inner cylinder covers the gap area between the cylinder sections of the outer cylinder. The additional aperture in the feed downpipe, the "360° window," is closed.

Each contact shoulder for the recess may be a projection arranged at random on the inner cylinder. For preference, each contact shoulder for the recess is a part of a radial projection of the inner cylinder, in the manner of a collar flange.

In order for the bridging elements which connect the cylinder sections only to reduce the free opening surfaces of the "360° window" by an insignificant amount, and nevertheless to connect the cylinder sections to one another in an adequately stable and secure manner, a special design and cross-sectional shape has been selected for the bridging elements. Each bridging element is a flat web, of which the web surface plan runs radially to the axis of the inner or outer cylinder in each case. The number of flat webs can be varied. Four webs for the inner cylinder and seven webs for the outer cylinder have proved their worth. To particular advantage, the bridging elements of the outer cylinder which pertain as flat webs feature the form of paddles or vanes projecting radially over the periphery of the outer cylinder into the feed bowl.

The vanes at the outer cylinder control and maintain the uniform feed distribution into the feed plates, even if the entire feed bowl is intended to swing or move in pendulum fashion about the delivery pipe, and prevent the excessive scratching and pecking of the animals in the feed, which can result in feed losses.

It is intended that the feed should be discharged and distributed as uniformly as possible from the downpipe. In this situation, an overflow of the feed from the feed bowl due to an excessively high feed level is to be avoided just as too low a feed level, which impedes the feeding of the animals. For the correct metering of the feed into the bowl, it is determinant, as already mentioned, that a predetermined distribution cone be formed and maintained in the feed bowl, whereby the distribution cone can in turn be influenced by the distance interval between the feed outlet apertures present in the downpipe and the feed bowl. The distance between the feed bowl and the lower free end of the downpipe or from the "360° window" respectively therefore has a substantial influence on the feed level in the bowl, and it is in turn dependent on the feed level as to whether the feed consumption by the animals takes place in optimum fashion. The possibility of altering or adjusting the interval distance between the feed bowl and the lower free end or between the feed bowl and the "360° window" of the downpipe is advantageous, and with the device according to the invention is achieved in terms of design in that the outer surface of an upper cylinder section of the outer cylinder is designed as a threaded spindle and that the free ends of the grid bars of the bowl cupola are connected to a screw ring, which is screwed onto the area of the outer cylinder designed as a threaded spindle.

The pitch of the threaded spindle is selected for preference of such a type that, even at relatively low extension or angular movement of the feed bowl, a perceptible change is noticeable between the distance between the feed bowl and the feed delivery pipe, from which the downpipe with its apertures departs.

As described heretofore, the feed bowls begin to rotate about an upright axis when subjected to cleaning under a water jet. This rotation is even desirable. The rotary movement does have the disadvantage, however, that the feed level which has been set may as a result be unintentionally changed. After cleaning, all the feed bowls in the feed line in a coop would therefore have to be readjusted, which involves a considerable amount of work.

The undesirable automatic change of setting or rotation of the feed bowls is prevented with the device according to the invention in that it features at least one rotational stop, which prevents or at least delimits the rotational path of the outer cylinder in relation to the inner cylinder.

In this situation, the formation and arrangement are set in such a way that each rotational stop features at least one elevation arranged at a predetermined area of the outer surface of the inner cylinder, as well as at least one driver dog or projection located on the inner surface of the outer cylinder, into the rotational path of which, during the rotation of the outer cylinder about the inner cylinder, the elevation projects. If the feed bowl rotates, and therefore the outer cylinder on which the feed bowl is suspended, in relation to the inner cylinder, the projection strikes against the elevation at the latest after a predetermined rotational path has been covered, and prevents it from rotating back again.

The predetermined area of the outer surface of the inner cylinder, which is provided with the elevation for the rotational stop, is the upper head part, which is offset against the other part of the inner cylinder as a result of the reduced cylinder diameter. The feed bowl and its outer cylinder can therefore only rotate freely about the inner cylinder in that position in which it is suspended above the raising stops between the outer and inner cylinder on the inner cylinder. In the upper position, i.e., in a lowered position of the feed delivery pipe and therefore also of the inner cylinder in which the feed bowl rests, and, as a result, its outer cylinder is raised in relation to the inner cylinder, the projection is, by contrast, in the area of effect of the elevation located on the upper head part of the inner cylinder, said elevation projecting into the rotational path of the projection on the outer cylinder. The outer cylinder, and therefore the feed bowl, is therefore only capable of rotation in the upper position until the rotational movement is stopped by the rotational stop.

The device according to the invention is also characterized by the fact that the automatic, uncontrolled, and therefore undesirable rotation of the screw ring in relation to the outer cylinder is prevented, which would in consequence result in an incorrect setting of the feed level in the feed bowl, that the outer cylinder features, in its area designed as a threaded spindle, at least one spring-elastic engagement cam, preferably a spring elastic in the radial direction, which can engage in positive fit with cut-outs which are featured by the screw ring in its inner circumferential surface.

With the device according to the invention, it is of particular inventive significance that the rotational stop, in conjunction with the areas of the inner cylinder offset in respect of the diameter, serves the purpose of blocking the specified setting of the feed level, if required, against unintentional actuation by means of the engagement cams in the suspended position or, if appropriate, in the raised position of the bowl. This is achieved in that the engagement cams and the cut-outs are provided with run-on flanks aligned obliquely to the direction of rotation about the upright axis.

Because the engagement cams and the cut-outs are provided with run-on flanks aligned obliquely to the direction of rotation, the spring-elastic engagement cams are deflected with the appropriate application of force during rotation, and in a similar manner to a cam drive are deflected out of the cut-outs. After the deflection of the engagement cams from the cut-outs, the screw ring can be further rotated on the thread of the outer cylinder, whereby the feed stand position defining the feed level changes, as described heretofore. As soon as the engagement cams have reached an adjacent cut-out, they engage again into this cut-out, or the screw ring, under the repetition of the deflection movement, may rotate further.

This is only possible, however, in the upper position of the outer cylinder in relation to the inner cylinder, because, due to the offset outer surface of the inner cylinder with the reduced cylinder diameter, there is sufficient room behind the engagement cams into which they can be moved during rotation and raising out of the cut-outs. In the lower suspended position, the outer surface of the inner cylinder is supported from behind against the engagement cams because of their enlarged outer diameter at that point, with the result that clearance of the feed stand positions which have been set, and raising from the cut-outs, are not possible even with the greatest exertion of force.

In view of the fact that, during cleaning, the entire feed line is raised with the feed pipe, and, as a consequence, only the suspended position of the outer cylinder is provided, in this suspended position of the outer cylinder it is automatically guaranteed that the previously-set feed stand positions will be locked in place, and unintentional changing of the feed stand positions is therefore not possible. The feed bowl can however be rotated freely on the inner cylinder, in the suspended position of the outer cylinder, for the purpose of cleaning.

Only in the raised position of the feed bowl and the external cylinder connected to it is an adjustment of the feed stand position possible by the rotation of the screw ring on the threaded spindle part of the outer cylinder, because only in this position can the engagement cams be deflected out of the cut-outs of the screw ring with the aid of the rotary stops, acting in the manner of a driver dog.

To adjust the feed stand position which has been set, the unit consisting of the feed bowl, cupola and outer cylinder is therefore first to be raised. This unit can then be rotated about the upright axis in the direction of rotation of the desired change of the feed stand, until the point at which driver dogs present on the outer cylinder in the form of projections have reached the separation cylinder, and the outer cylinder is secured against a further rotation. In the continuation of the rotational movement, with increasing effect of force, the engagement cams release the feed stand positions, in order, after a predetermined path of rotation, to be able to engage again in the next feed stand position.

To improve the cleaning effect and facilitate cleaning work, in a further embodiment of the device according to the invention there is incorporated the measure that the feed bowl features a feed plate, which in the area of the plate edge features connecting elements to connect to the bowl cupola. The connecting elements may feature a folding joint and at least one locking or retention element. Instead of a connection with the bowl cupola, the feed plate also may be formed, in the area of its plate edge, of two plate edge sections, one of which is connected to the grid bars of the bowl cupola, and which are connected to each other by means of at least one folding joint and at least one locking or retaining element, e.g. clamps. Of particular advantage is an unhookable folding joint, so that a feed plate can be replaced if necessary.

The feed plate is designed to be conical in the center, so that feed falling into the feed plate from the unit of inner cylinder and outer cylinder forming the downpipe can slide outwards.

To improve feed consumption by the animals, a ring surface of the feed plate, which runs around the center of the plate located beneath the downpipe, is divided into feeding sections. Each feeding section consists of at least one plate, one field, or the like by way of a shape delimited by a depression or elevation.

To particular advantage, the number of feeding sections is equal to a multiple of the number of the bridging elements of the outer cylinder designed as paddles or vanes.

If, for example, seven cut-outs are arranged on the inner circumference of the screw ring, then this specifies seven feed stand positions, which can be adjusted by the rotation of the screw ring in relation to the outer cylinder. The outer cylinder itself features in its thread area at least one, and preferably two, engagement cams, which are located on the circumference of the outer cylinder in such a way that they can engage simultaneously in cut-outs of the screw ring arranged for each of them. With seven possible feed stand positions, it is possible to arrange seven bridging elements at the circumference of the outer cylinder, and to design these as paddles or vanes, so that they control and maintain the uniform distribution of the feed into the feed plate. In the case of the feed plate subdivided into 14 sections, there are then two fields or pockets of the feed plate in each case between two bridging elements of the outer cylinder present in the form of vanes or paddles, so that on the one hand it is easy for the animals to take the feed and, on the other, it is rendered more difficult for them to scatter feed sideways out of the feed bowl. Because of the seven feed stand positions selected in the threaded connection between the outer cylinder and screw ring and because of the hinge connection between the feed plate and bowl cupola, the seven paddles or vanes can come into unambiguous concordance in relation to the fields or pockets of the feed plate.

These and other features, advantages and objects of the present invention will be further understood and appreciated by those skilled in the art by reference to the following specification, claims and appended drawings.

BRIEF DESCRIPTION OF THE DRAWINGS

An embodiment of the invention, from which further inventive features can be derived, is represented in the drawings. These show:

FIG. 9 is a section through the downpipe of the device according to FIG. 8, consisting of inner cylinder and outer cylinder, in a section along the line IX-IX in FIG. 8.

FIG. 10 is a view of a feed bowl, in which, to make the feed plate clearer, the bowl cupola has been removed.

DETAILED DESCRIPTION OF THE PREFERRED EMBODIMENT

The device for feeding free-range poultry for fattening kept in a coop, and broilers in particular, consists of at least one feed delivery pipe 1, held above the floor of the coop in a lowerable manner, which runs along the entire length of the coop and, by means of a delivery worm element located inside it, or a cable or a chain with delivery disks, transports feed capable of scatter distribution to individual bowl devices 2 suspended on the feed delivery pipe 1. The parts described can also be designated in their entirety as the feed line.

Figure 1:
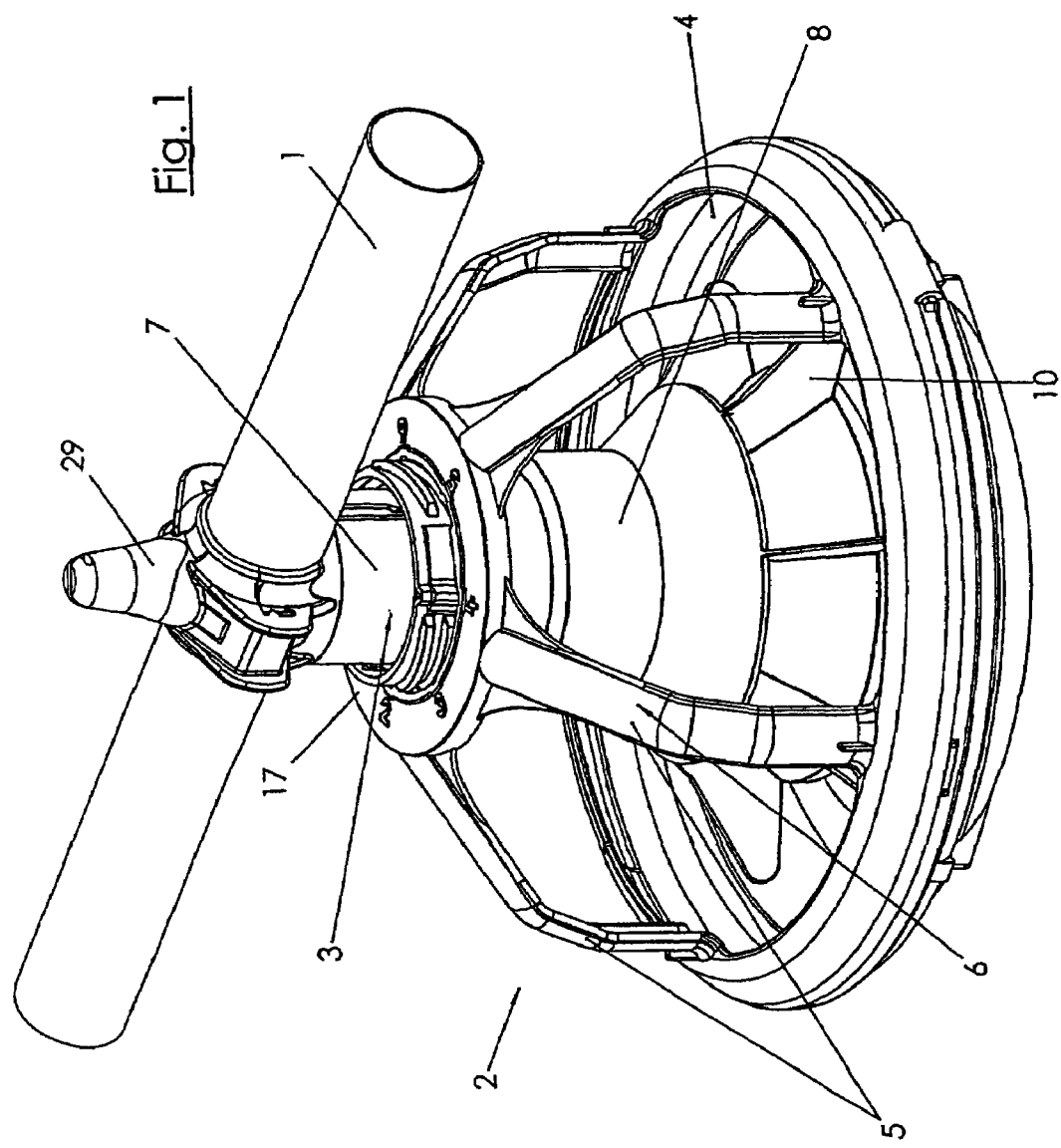
FIG. 1 is a view of the bowl device suspended on the feed delivery pipe, for the feeding of broilers.

In FIG. 1, only one part of the feed delivery pipe 1 is represented, with a bowl device 2 suspended in the area of a branch aperture in the feed delivery pipe 1. The bowl device 2 comprises a downpipe 3, departing from a branch aperture not further visible here, and a feed bowl 4 located beneath the downpipe 3, with bowl cupolas 6 formed from grid bars 5 running in spoke fashion. In this situation, the downpipe 3 consists of an inner cylinder 7, departing from the branch aperture not visible here, and an outer cylinder 8, surrounding the inner cylinder 7, on which the bowl 4 is suspended by means of the grid bars 5 of its bowl cupola 6, in such a way that, when the feed delivery pipe 1 is lowered, it comes to rest, and in particular comes to rest on the floor 34 of the coop, not represented any further here. The outer cylinder 8 is guided in rotatable fashion at the inner cylinder 7 and in a raisable and lowerable manner, whereby at least one lifting stop is provided to delimit the lifting and lowering path, which will be described in greater detail hereinafter.

Figure 2:
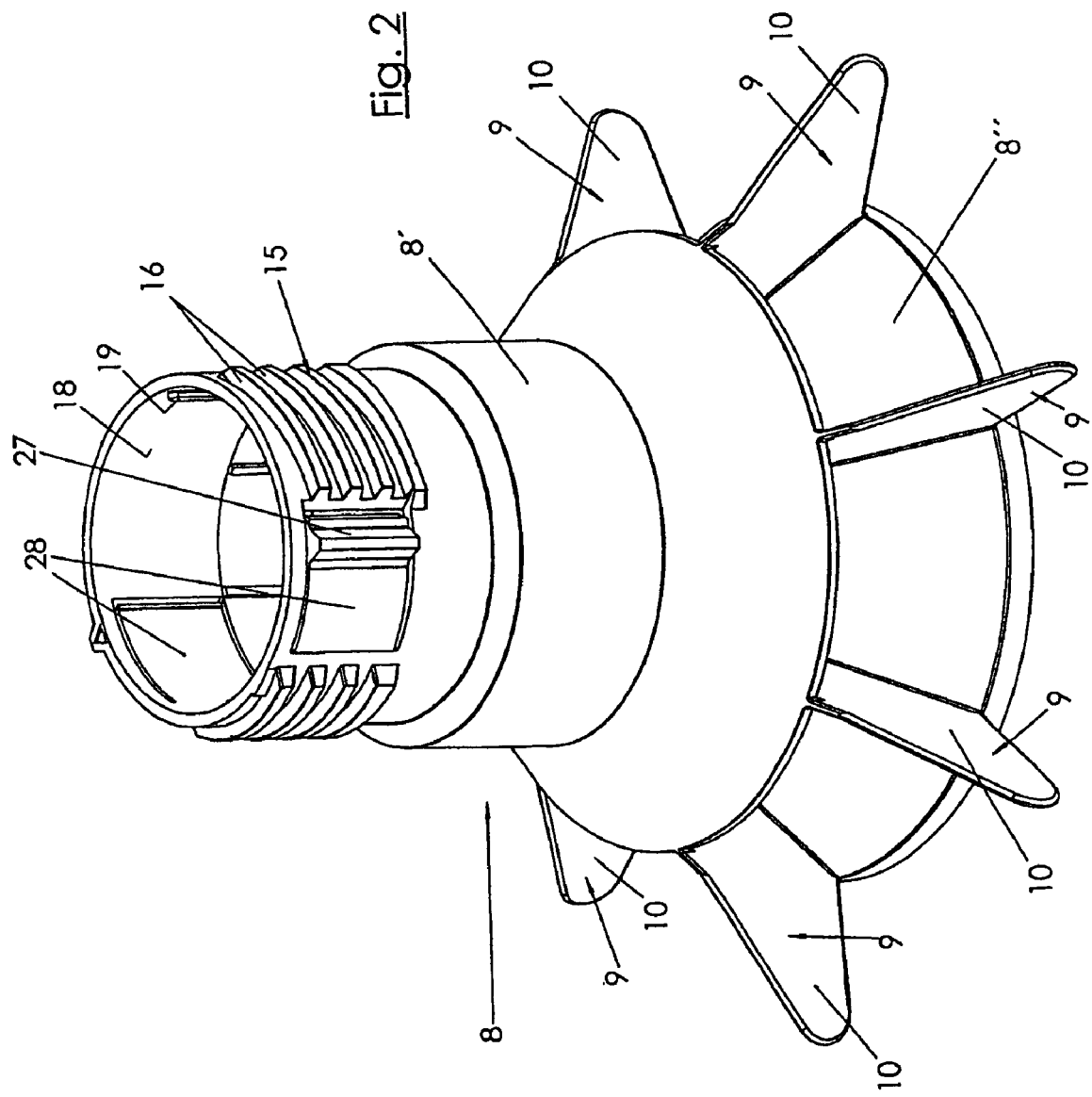
FIG. 2 is a view of an outer cylinder.

FIG. 2 shows a view of the outer cylinder 8.

Figure 3:
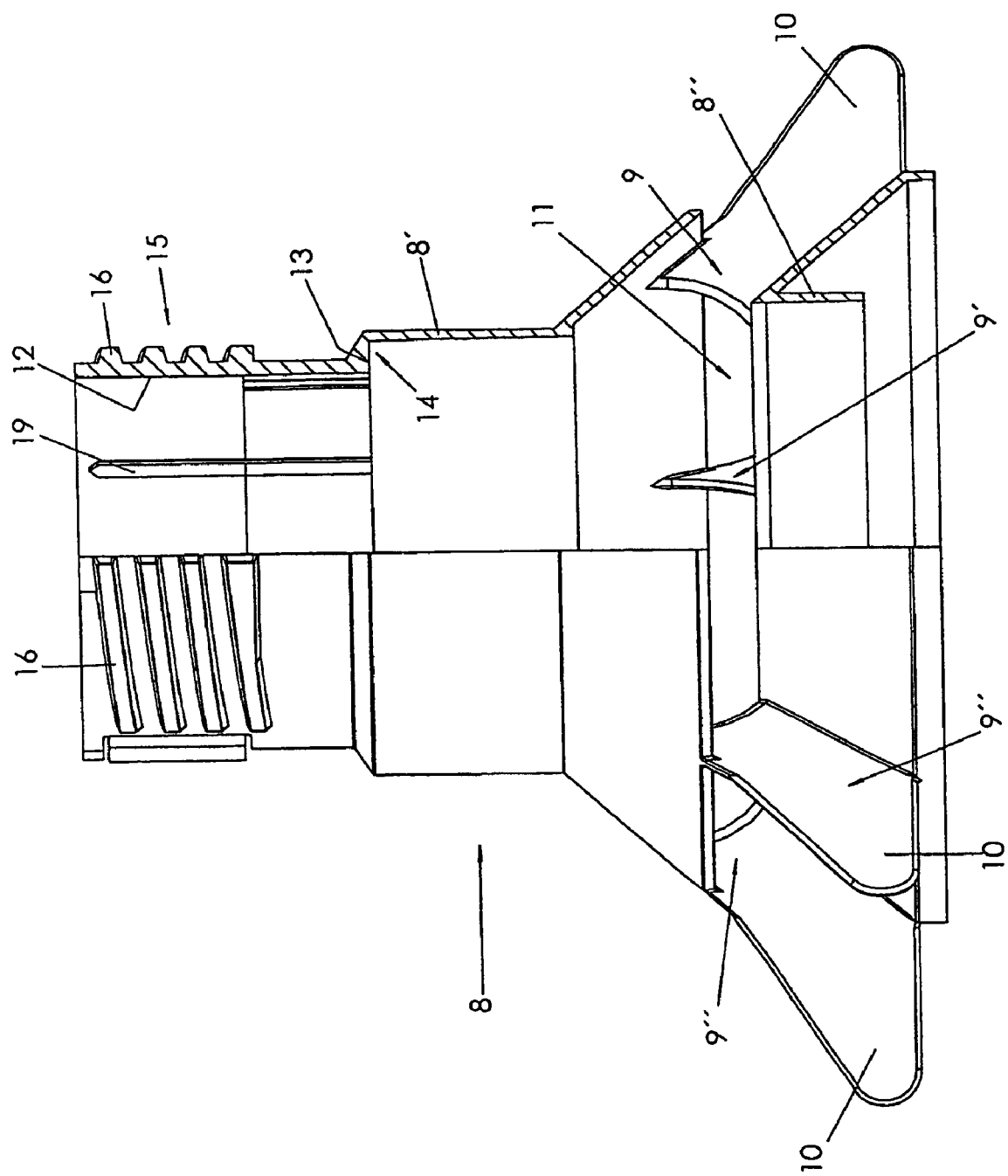
FIG. 3 is a side view of the outer cylinder according to FIG. 2, in a half-section.

In FIG. 3, a side view of the outer cylinder 8 according to FIG. 2 is shown, in a half-section.

FIGS. 2 and 3 are explained in greater detail hereinafter.

The outer cylinder 8 consists of adjacent cylinder sections 8' and 8", co-axial to each other. The cylinder sections 8' and 8" are connected to each other by means of bridging elements 9, each of which is designed as a paddle or vane 10, projecting over the periphery of the outer cylinder 8 into the feed bowl 4. The bridging elements 9 bridge the gap area 11, which corresponds to the distance between the cylinder sections 8' and 8" of the outer cylinder 8, or in this case its upper cylinder section 8', features a recess 13, which is part of a lifting stop 14. The outer surface of the upper cylinder section 8' of the outer cylinder 8 is designed in the upper end part as a threaded spindle 15, which has screw threads 16.

The outer cylinder is made of suitable plastic material, with the result that the screw threads 16 and therefore the threaded spindle 15 can be shaped without problem during the manufacture of the outer cylinder 8.

As FIG. 1 also shows, the free ends of the grid bars 5 of the bowl cupola 6 are connected to a screw ring 17, which can be screwed onto the area designed as a threaded spindle 15 of the cylinder section 8' of the outer cylinder 8.

At the rotation of the feed bowl 4, relative to the outer cylinder 8, the threaded spindle 15 causes a movement of the feed bowl 4 in respect of the height, towards the lower end of the cylinder section 8" with the vanes 10 of the outer cylinder 8.

FIGS. 2 and 3 further show that a rotational stop delimiting the rotational path of outer cylinder 8 in relation to the inner cylinder 7 features a driver dog 19, located in this case on the inner surface 18 of the outer cylinder 8, into the rotation path of which he elevation 21 arranged on the outer surface 20 of the inner cylinder 7 projects during the rotation of the outer cylinder 8 about the inner cylinder 7.

Figure 4:
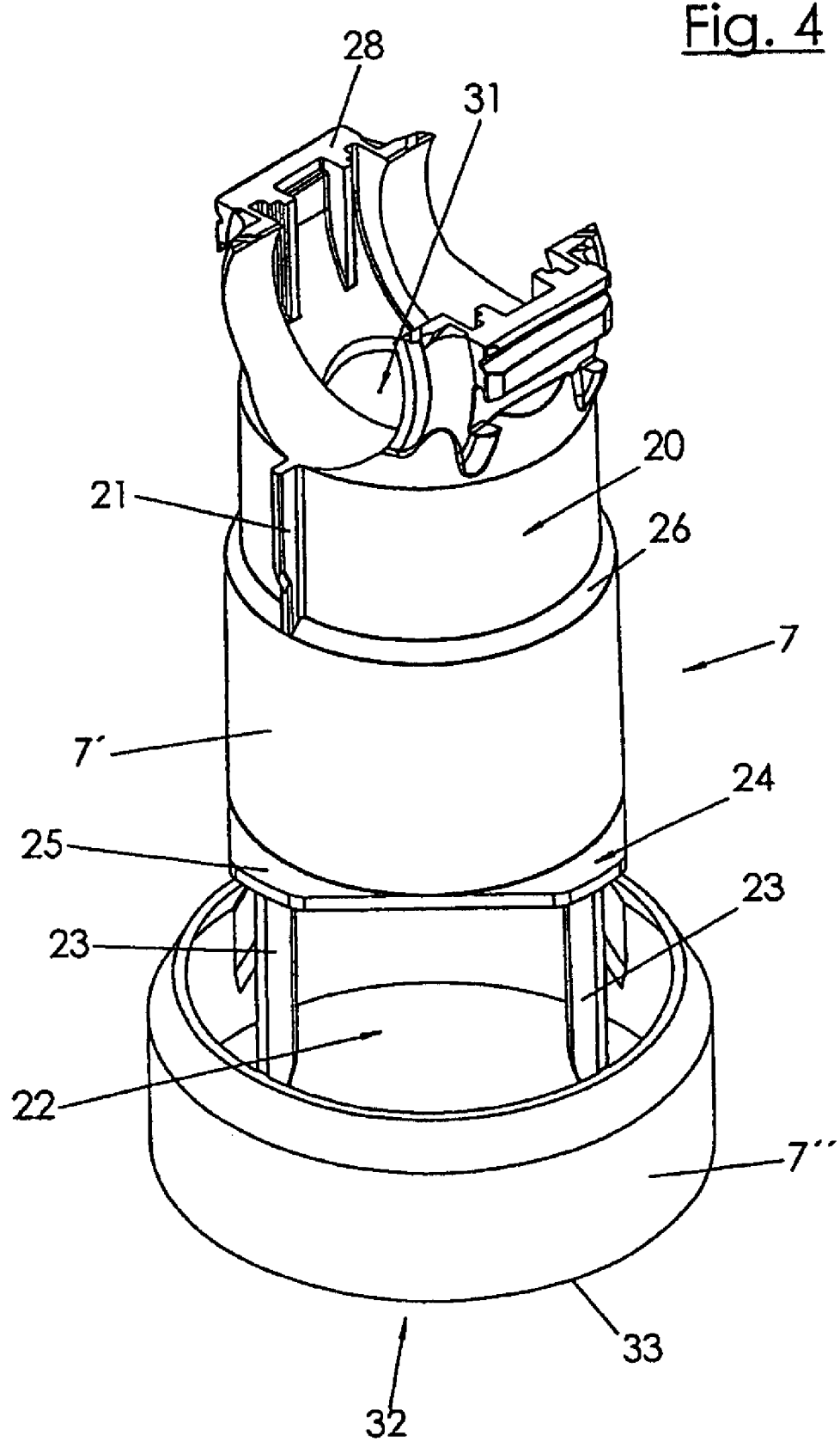
FIG. 4 is a view of the inner cylinder, with upper pipe adapter for securing to the feed delivery pipe without a closing upper part.

FIG. 4 shows a view of the inner cylinder 7, which consists of cylinder sections 7' and 7", whereby the open gap area between the cylinder sections 7' and 7" is again bridged by bridging elements 23 in flat web form. In FIG. 4, a part of the lifting stop 14 is visible, which at the inner cylinder 7 is designed as at least one abutment shoulder 24 for the recess 13 in the outer cylinder 8, projecting radially from the inner cylinder 7.

FIG. 4 shows that each abutment shoulder 24 for the recess 13 is a part of a radial projection 25 of the inner cylinder 7, similar to a collar flange in shape. FIG. 4 also shows that the outer surface 20 of the inner cylinder 7, in the upper area and therefore in the area of its head part, is offset by means of a reduced cylinder diameter in relation to the other part of the cylinder section 7' of the inner cylinder 7. The offsetting step is designated by 26.

FIG. 2 further shows that, to provide securing against rotation of the structural unit consisting of the screw ring 17 (FIG. 1) with bowl cupola 6 and the feed bowl 4, there is provided at each outer cylinder 8, in its area designed as a threaded spindle 15, two spring-elastic engagement cams 27. Each engagement cam 27 is connected by means of a spring-elastic tongue 28 to the outer cylinder 8. In this situation, removal from the mold is effected in such a way that the tongues are wall parts of the outer cylinder, formed by insertion cuts, which are capable of springing from the outside inwards under radial pressure and can be moved back elastically into the initial position when the pressure is released. In the pressureless initial position, the tongues 28 are flush again with the wall of the outer cylinder 8.

Figure 5:
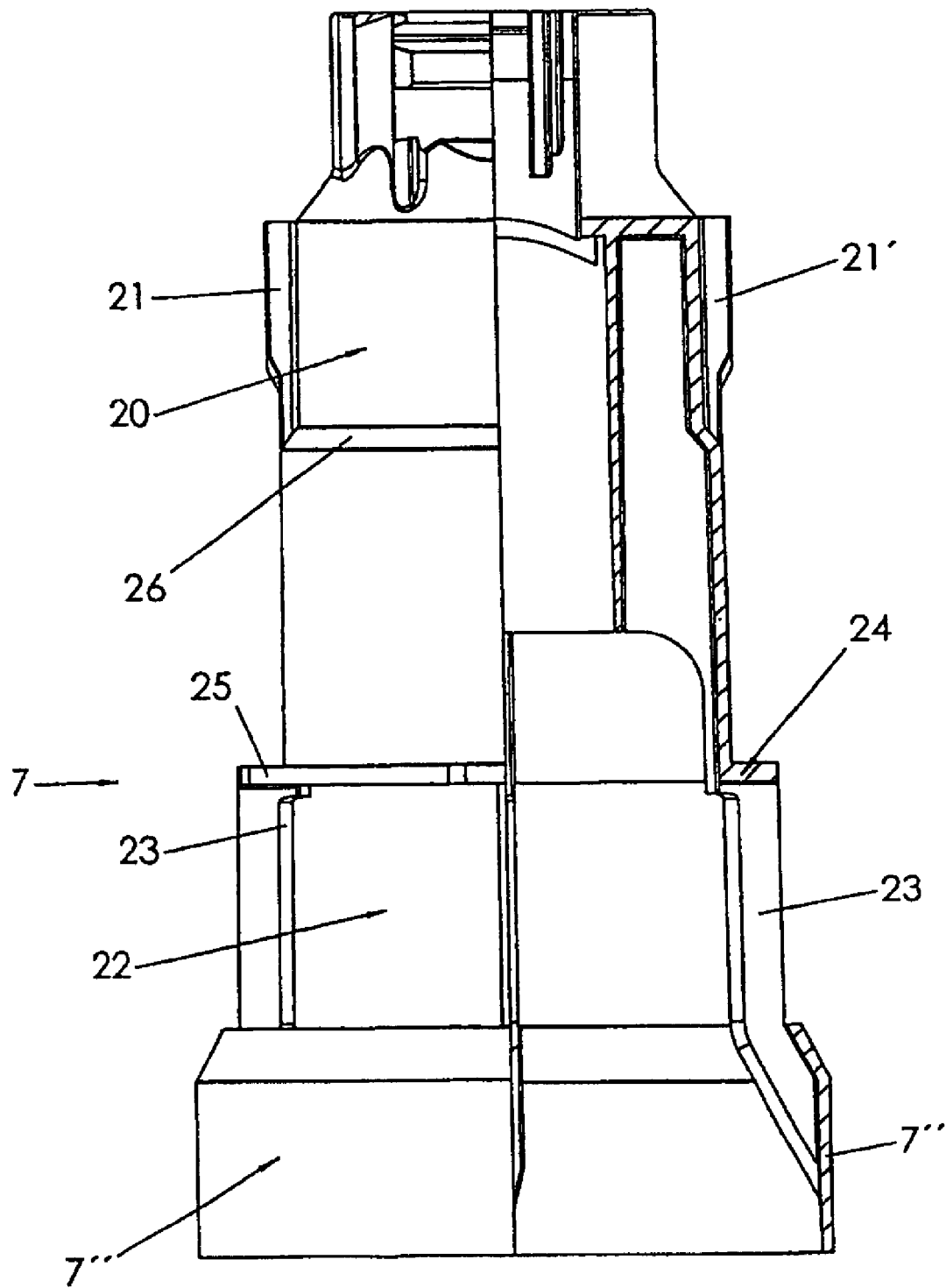
FIG. 5 is a side view of the inner cylinder, in a half-section.

FIG. 5 shows a side view of the inner cylinder, whereby the right half of the inner cylinder is shown in a longitudinal section.

The same components are designated with the same reference numbers.

FIG. 4 in particular shows that the inner cylinder 7 in its upper free end is involved in the formation of a pipe adapter, in that a bowl half 29 of the pipe adapter is formed on the inner cylinder 7. This bowl half can be supplemented to form the pipe adapter by the imposition of an upper part 30, which is visible in FIG. 1, which encompasses the feed pipe 1 in the area of a branch aperture, not further shown, in such a way that the branch aperture is flush with the fall aperture 31 in the upper bowl part 29 of the inner cylinder 7. Feed emerging from the feed delivery pipe passes over the branch aperture and the fall aperture 31 into the inner cylinder, and can fall into the feed bowl via the gap area 22 or into the lower fall aperture 32. The lower fall aperture 32 is circumscribed by the lower edges 33 of the cylinder section 7″.

Figure 6:
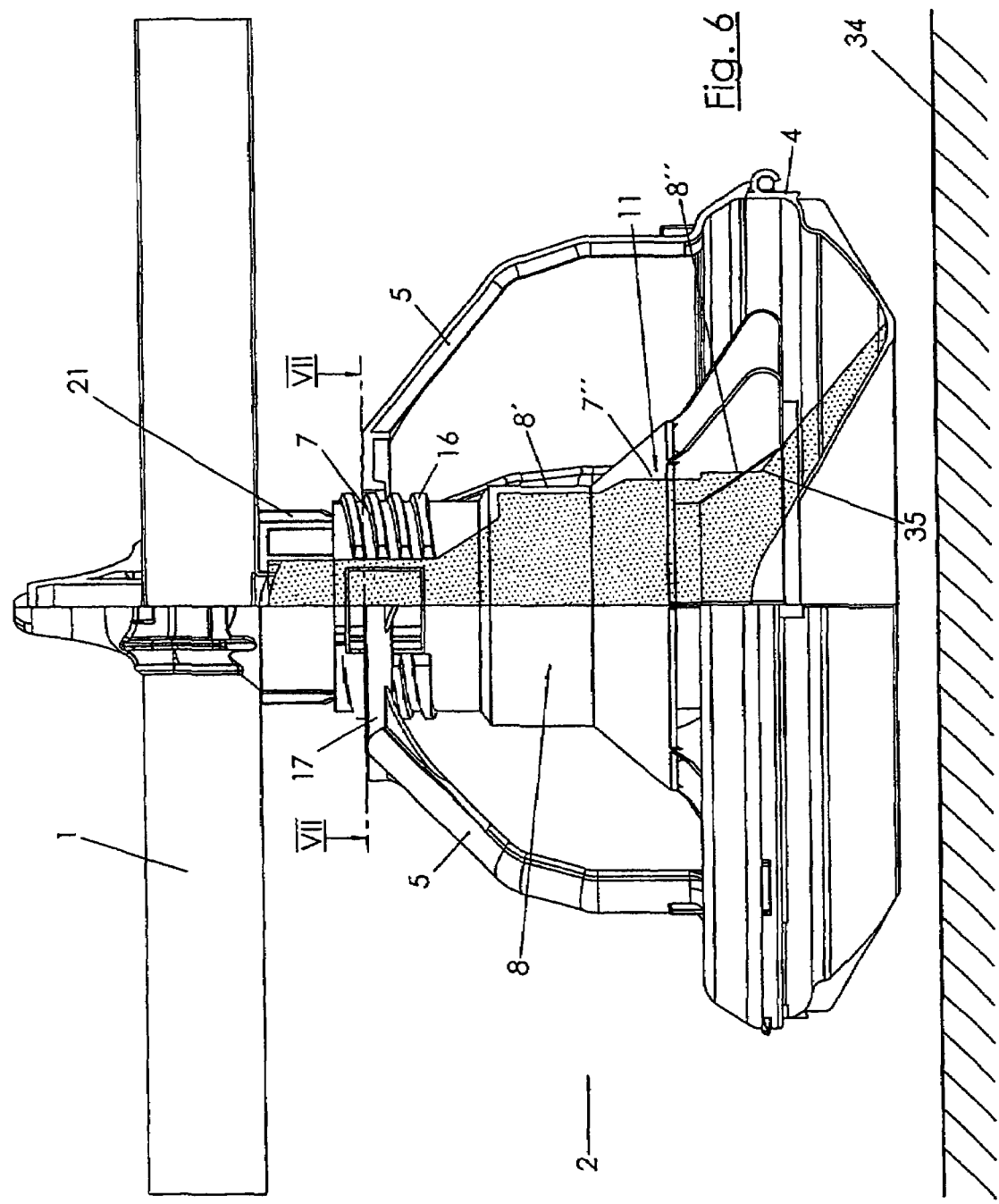
FIG. 6 is a side view of the device according to FIG. 1, in a half-section with the feed delivery pipe raised, so that the feed bowl hangs freely above the floor of a coop.

FIG. 6 shows, in a side view, a bowl device 2 suspended on a feed delivery pipe 1, whereby the right-hand side is shown in section. The same components are designated with the same reference numbers.

It can be seen from FIG. 6 that the inner cylinder 7 is designed in such a way that its end-side cylinder section 7″ covers the gap area 11 between the cylinder sections 8′ and 8″ of the outer cylinder 8, when the outer cylinder 8 is moved by a raising of the feed delivery pipe 1 into a position which is lowered in relation to the inner cylinder 7, in which the parts forming the lifting stop 14 are in opposing positions. With this embodiment, it can be seen in FIG. 6 that the outer cylinder 8, with the step surface formed by its recess 13 in the cylinder section 8′, is in contact on the abutment shoulder 24 of the radial projection 25 of the inner cylinder 7. Feed material entering the inner cylinder 7 from the feed delivery pipe is represented here by dots, and trickles into the feed bowl 4, whereby it trickles out of the lower fall aperture 32 of the inner cylinder 7 into the cylinder section 8″ of the outer cylinder 8, and from there directly into the feed bowl 4. This feed covers the conically-shaped floor of the feed bowl 4, likewise made of plastic, in a flat dispersal, as can be seen here. Poultry running about on the floor 34 of the coop can reach the feed located in the depth of the feed bowl 4.

The height of the dispersal cone of feed above the floor of the feed bowl 4 is adjustable. To regulate the feed level, or to adjust what is referred to as the feed stand position, the screw ring 17, to which the grid bars 5 of the bowl cupola 6 are connected, is rotated about a height axis. Depending on the rotation path and pitch of the screw threads 16, the position of the bowl is displaced in relation to the lower emergence edge 35 of the lower free end of the outer cylinder section 8″.

Figure 7:
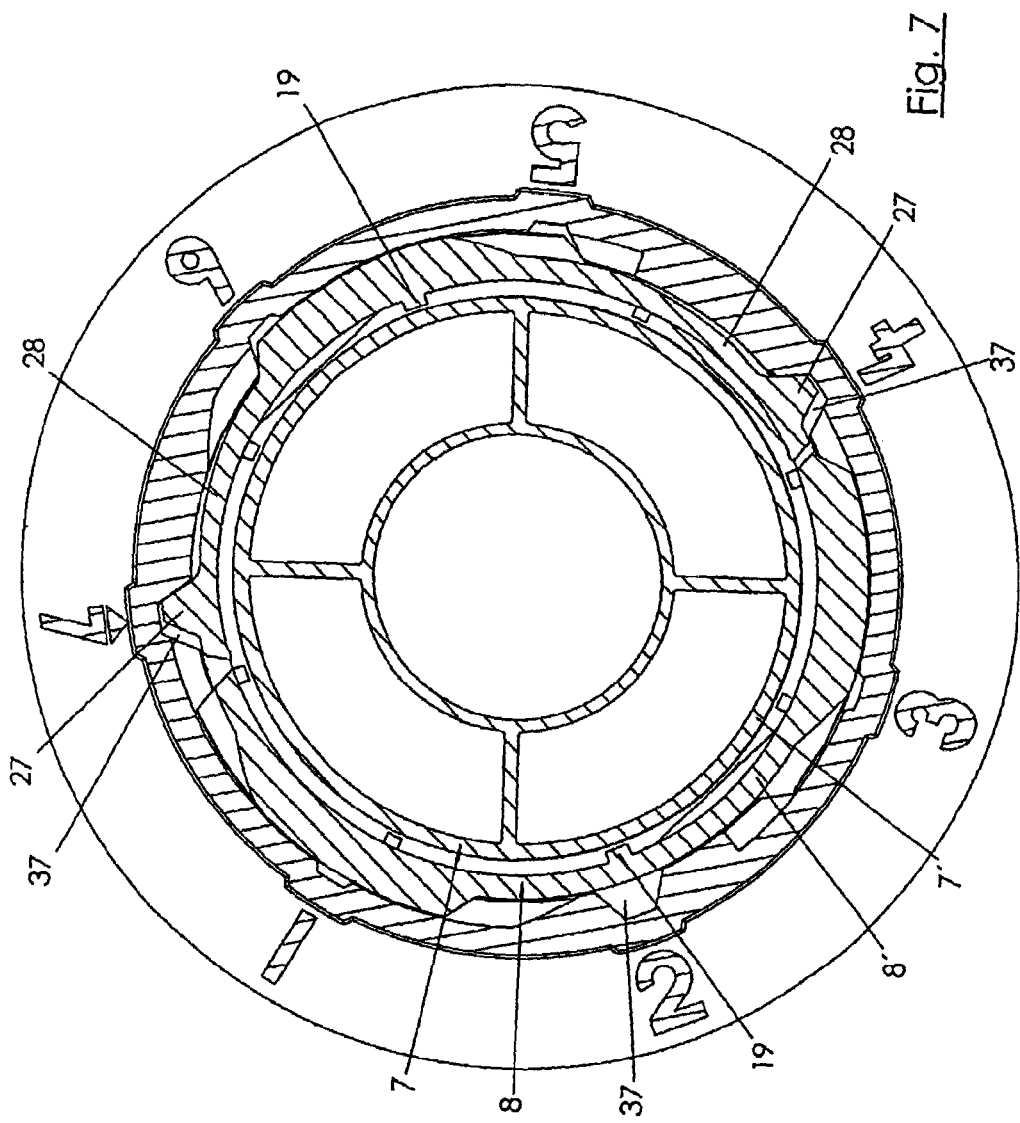
FIG. 7 is the unit of a downpipe, formed from the inner cylinder and the outer cylinder guided on this, in a sectional view along the line VII-VII in FIG. 6.

FIG. 7 is a sectional view along the line VII-VII in FIG. 6. The same components are designated by the same reference numbers. FIG. 7 shows that the inner cylinder 7, of which the cylinder section 7′ is visible here, is encompassed by the outer cylinder 8, or by its cylinder section 8′, visible here. The outer cylinder, in the position represented here, is therefore freely rotatable about the inner cylinder 7. In FIG. 7, the driver dogs 19 can be seen which are arranged on the inner surface of the outer cylinder 8.

The screw ring 17 features on its inner circumferential surface 36 cut-outs 37. Engagement cams 27, which are mounted on the spring-elastic tongues 28, can engage with the cut-outs 37, so that the screw ring 17, with the engagement cams 27 engaged in the cut-outs 37, cannot be rotated in relation to the outer cylinder 8. The feed level, once set, can be maintained. In the event of rotational forces being imposed on the feed bowl or via its bowl cupola on the screw ring 17, the unit consisting of the outer cylinder 8, screw ring 17, bowl cupola 6 and feed bowl 4 will rotate only in relation to the inner cylinder 7. The inner cylinder 7 cannot rotate together because of its suspension on the feed delivery pipe 1.

Figure 8:
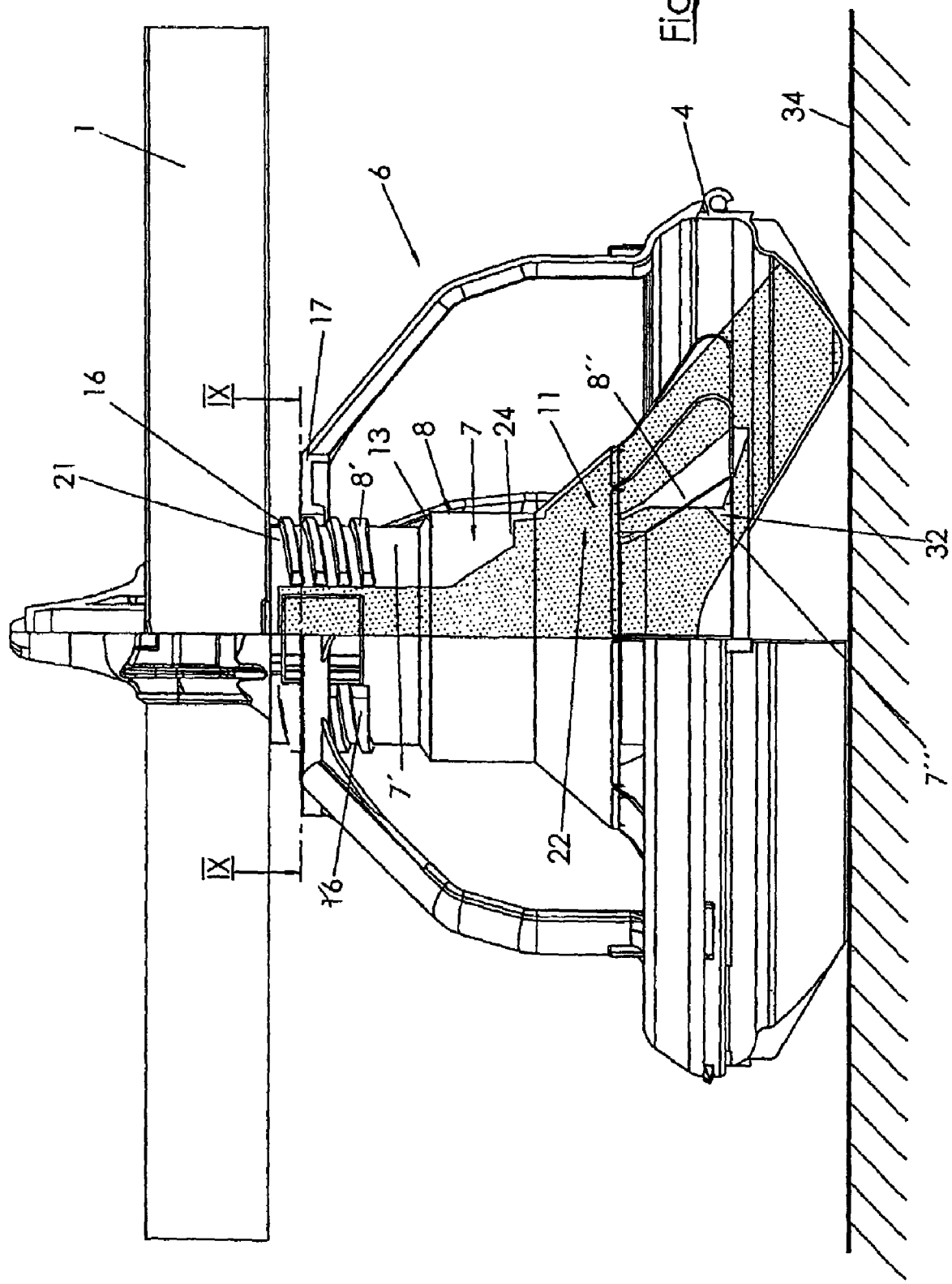
FIG. 8 is a side view of the device with the feed delivery pipe lowered, so that the feed bowl is resting on the floor of the coop.

FIG. 8 shows a side view according to FIG. 6, whereby the right half is in turn shown in section. The feed delivery pipe is lowered in the position shown in FIG. 8, so that it runs at a slight distance above the floor 34 of the coop. The feed bowl 4, in the position shown in FIG. 8, rests on the floor 34 of the coop, as a result of which the unit formed by the outer cylinder with the bowl cupola 6 and the feed bowl 4 is raised in relation to the inner cylinder 7. In this position, the recess 13 forming the lifting stop 14 and the abutment shoulder 24 of the inner cylinder 7 are no longer in mutually opposed positions. The outer cylinder 8 with its cylinder sections 8′ and 8″ are therefore raised in relation to the inner cylinder to such an extent that the gap area 11 between the cylinder sections 8′ and 8″ of the outer cylinder 8 is congruent with the gap area 22 between the cylinder sections 7′ and 7″ of the inner cylinder 7. As a result of the congruent open gap areas 11 and 22, which form a "360° window", the feed can additionally pass to the lower fall aperture 32 into the feed bowl 4, as is represented here by dots. The feed level in the feed bowl 4 is simultaneously higher, with the result that even young animals, such as chicks, can reach over the edge of the feed bowl 4 to the feed, which now stands higher in the feed bowl 4.

FIG. 8 also indicates that the upper area of the cylinder section 8′ of the outer cylinder 8, which is provided with screw threads 16, onto which the threaded ring 17 is screwed, are now raised to such an extent that the driver dogs 19, not visible here, can be brought into effective connection by means of an elevation 21 or 21′ of the inner cylinder 7.

FIG. 9 again shows that the elevations 21 and 21′ on the outer surface 20 of the cylinder section 7′ of the inner cylinder 7 can come in contact with the driver dogs 19, which project from the inner surface 18 of the cylinder section 8′ of the outer cylinder 8. The driver dogs 19 of the fixed inner cylinder 7 prevent the further rotation of the outer cylinder 8 beyond the position of the elevation 21 and 21′. The outer cylinder 8 can therefore only be rotated through 180° in each case, and further rotation is accordingly stopped by the elevation 21 or 21′ respectively. If the outer cylinder is nevertheless rotated further, for example in order to change the level of the feed with the aid of the threads on the outer cylinder and with the aid of the screw ring 17, then the engagement cams 27, because of their oblique flanks 38, will be pressed out of the cut-outs 37 in the screw ring, said cut-outs also being provided with oblique edges 39. The engagement cams 27 are in this situation deflected inwards, and specifically against the elastic resetting force of the tongues 28. With the corresponding further rotation into the next feed position, which is indicated here by numbers on the screw ring, the engagement cams 27 can engage again in the next cut-out 37, as shown in FIG. 7.

FIG. 10 shows the view of a bowl device, of which the bowl cupola has been left out for simplification of the internal arrangements of the feed bowl 4. The same components are designated with the same reference numbers.

FIG. 10 shows in particular that the feed bowl 4 features a feed plate, which in the area of its plate edge 40 features connecting elements 41 and 42 for connection to the bowl cupola 6, not visible here. The connecting elements 41 and 42 comprise a folding joint 43 and at least one locking or retention element 44. A ring surface of the feed plate, which runs around the plate center located beneath the downpipe 3, is subdivided into feeding sections, whereby each feeding section consists of at least one pocket, one field, or similar shaped area 45, delimited by depression or elevation. The number of feeding sections is equal to a multiple of the number of the bridging elements 9 of the outer cylinder 8, formed as paddles or vanes 10, of which the cylinder sections 8' and 8" are visible here, with the gap area 11 located between them.

The above description is considered that of the preferred embodiment only. Modification of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

The invention claimed is:

1. A device for the feeding of free-range poultry kept in a coop with at least one feed delivery pipe held above a floor of the coop and capable of being raised and lowered, the pipe having at least one aperture, comprising:

a bowl device configured to be suspended on the feed delivery pipe, the bowl device including a feed bowl located beneath a downpipe, the bowl device further including a cupola formed from grid bars in spoke fashion, wherein the downpipe comprises an inner cylinder configured to depart from the aperture and an outer cylinder encompassing the inner cylinder, on which the bowl is suspended by the grid bars of the bowl cupola in such a way that, when the feed delivery pipe is lowered, the bowl comes to rest on the floor of the coop, wherein the outer cylinder is guided in a rotatable manner as well as in a raisable and lowerable manner on the inner cylinder, and at least one lifting stop is provided for delimiting a lifting and lowering path of the bowl;

wherein the downpipe includes at least one rotational stop delimiting a rotational path of the outer cylinder in relation to the inner cylinder; and wherein the outer cylinder features at least one spring-elastic engagement cam.

2. A device according to claim 1, wherein:
ends of the grid bars of the cupola are connected to a screw ring that surrounds the outer cylinder.

3. A device for the feeding of free-range poultry kept in a coop with at least one feed delivery pipe held above a floor of the coop and capable of being raised and lowered, the pipe having at least one aperture, comprising:

a bowl device configured to be suspended on the feed delivery pipe, the bowl device including a feed bowl located beneath a downpipe, the bowl device further including a cupola formed from grid bars in spoke fashion, wherein the downpipe comprises an inner cylinder configured to depart from the aperture and an outer cylinder encompassing the inner cylinder, on which the bowl is suspended by the grid bars of the bowl cupola in such a way that, when the feed delivery pipe is lowered, the bowl comes to rest on the floor of the coop, wherein the outer cylinder is guided in a rotatable manner as well as in a raisable and lowerable manner on the inner cylinder, and at least one lifting stop is provided for delimiting a lifting and lowering path of the bowl;

wherein the downpipe includes at least one rotational stop delimiting a rotational path of the outer cylinder in relation to the inner cylinder; and wherein each rotational stop features at least one elevation, arranged in a predetermined area of the outer surface of the inner cylinder and at least one driver dog located on the inner surface of the outer cylinder, into the rotational path of which, at the rotation of the outer cylinder about the inner cylinder, the elevation projects.

4. A device according to claim 3, wherein:
a predetermined area of the outer surface of the inner cylinder in its upper head part is offset in relation to a remaining portion of the inner cylinder as a result of reduced cylinder diameter.

5. A device for the feeding of free-range poultry kept in a coop with at least one feed delivery pipe held above a floor of the coop and capable of being raised and lowered, the pipe having at least one aperture, comprising:

a bowl device configured to be suspended on the feed delivery pipe, the bowl device including a feed bowl located beneath a downpipe, the bowl device further including a cupola formed from grid bars in spoke fashion, wherein the downpipe comprises an inner cylinder configured to depart from the aperture and an outer cylinder encompassing the inner cylinder, on which the bowl is suspended by the grid bars of the bowl cupola in such a way that, when the feed delivery pipe is lowered, the bowl comes to rest on the floor of the coop, wherein the outer cylinder is guided in a rotatable manner as well as in a raisable and lowerable manner on the inner cylinder, and at least one lifting stop is provided for delimiting a lifting and lowering path of the bowl;

wherein the downpipe includes at least one rotational stop delimiting a rotational path of the outer cylinder in relation to the inner cylinder; and wherein the outer surface of an upper cylinder section of the outer cylinder includes a threaded spindle, and that ends of the grid bars of the bowl cupola are connected to a screw ring, which is screwed onto an area of the outer cylinder having the threaded spindle.

6. A device according to claim 5, wherein:
the outer cylinder features at least one spring-elastic engagement cam in an area defined by the threaded spindle.

7. A device according to claim 6, wherein:
each engagement cam is spring-elastic in a radial direction.

8. A device according to claim 5, wherein:
the screw ring includes cut-outs on its inner circumference surface, with which the engagement cams are capable of engaging with positive fit.

9. A device for the feeding of free-range poultry kept in a coop with at least one feed delivery pipe held above a floor of the coop and capable of being raised and lowered, the pipe having at least one aperture, comprising:

a bowl device configured to be suspended on the feed delivery pipe, the bowl device including a feed bowl located beneath a downpipe, the bowl device further including a cupola formed from grid bars in spoke fashion, wherein the downpipe comprises an inner cylinder configured to depart from the aperture and an outer cylinder encompassing the inner cylinder, on which the bowl is suspended b the rid bars of the bowl cupola in such a way that, when the feed delivery pipe is lowered, the bowl comes to rest on the floor of the coop, wherein the outer cylinder is guided in a rotatable manner as well as in a raisable and lowerable manner on the inner cylinder, and at least one lifting stop is provided for delimiting a lifting a lowering path of the bowl;

wherein the downpipe includes at least one rotational stop delimiting a rotational path of the outer cylinder in relation to the inner cylinder;

wherein the outer surface of an upper cylinder section of the outer cylinder includes a threaded spindle, and that ends of the grid bars of the bowl cupola are connected to a screw ring, which is screwed onto an area of the outer cylinder having the threaded spindle;

wherein the outer cylinder features at least one spring-elastic engagement cam in an area defined by the threaded spindle;

wherein the screw ring includes cut-outs on its inner circumference surface, with which the engagement cams are capable of engaging with positive fit; and wherein the engagement cams and the cut-outs include run-in flanks arranged obliquely to the direction of rotation.

10. A device for the feeding of free-range poultry kept in a coop with at least one feed delivery pipe held above a floor of the coop and capable of being raised and lowered, the pipe having at least one aperture, comprising:

a bowl device configured to be suspended on the feed delivery pipe, the bowl device including a feed bowl located beneath a downpipe, the bowl device further including a cupola formed from grid bars in spoke fashion, wherein the downpipe comprises an inner cylinder configured to depart from the aperture and an outer cylinder encompassing the inner cylinder, on which the bowl is suspended by the grid bars of the bowl cupola in such a way that, when the feed delivery pipe is lowered, the bowl comes to rest on the floor of the coop, wherein the outer cylinder is guided in a rotatable manner as well as in a raisable and lowerable manner on the inner cylinder, and at least one lifting stop is provided for delimiting a lifting and lowering path of the bowl;

wherein the downpipe includes at least one rotational stop delimiting a rotational path of the outer cylinder in relation to the inner cylinder;

wherein the outer cylinder is comprised of adjacent outer cylinder sections co-axial to each other, whereby outer face peripheral areas of the outer cylinder sections turned towards each other are connected to one another by outer bridging elements which bridge an outer gap area, which corresponds to an outer interval distance between the outer cylinder sections; and wherein the inner cylinder is comprised of adjacent inner cylinder sections co-axial to each other, whereby inner face peripheral areas of the inner cylinder sections turned towards each other are connected to one another by inner bridging elements which bridge an inner gap area, which corresponds to an inner interval distance between the inner cylinder sections.

11. A device for the feeding of free-range poultry kept in a coop with at least one feed delivery pipe held above a floor of the coop and capable of being raised and lowered, the pipe having at least one aperture, comprising:

a bowl device configured to be suspended on the feed delivery pipe, the bowl device including a feed bowl located beneath a downpipe, the bowl device further including a cupola formed from grid bars in spoke fashion, wherein the downpipe comprises an inner cylinder configured to depart from the aperture and an outer cylinder encompassing the inner cylinder, on which the bowl is suspended by the grid bars of the bowl cupola in such a way that, when the feed delivery pipe is lowered, the bowl comes to rest on the floor of the coop, wherein the outer cylinder is guided in a rotatable manner as well as in a raisable and lowerable manner on the inner cylinder, and at least one lifting stop is provided for delimiting a lifting and lowering path of the bowl;

wherein the downpipe includes at least one rotational stop delimiting a rotational path of the outer cylinder in relation to the inner cylinder;

wherein the outer cylinder features at least one spring-elastic engagement cam; and wherein an end-side cylinder section of the inner cylinder covers a gap area between the cylinder sections of the outer cylinder, when the outer cylinder is moved by the raising of the feed delivery pipe into a position which is lowered in relation to the inner cylinder, in which lifting stops of the inner cylinder and the outer cylinder are in mutually opposed positions.

12. A device for the feeding of free-range poultry kept in a coop with at least one feed delivery pipe held above a floor of the coop and capable of being raised and lowered, the pipe having at least one aperture, comprising:

a bowl device configured to be suspended on the feed delivery pipe, the bowl device including a feed bowl located beneath a downpipe, the bowl device further including a cupola formed from grid bars in spoke fashion, wherein the downpipe comprises an inner cylinder configured to depart from the aperture and an outer cylinder encompassing the inner cylinder, on which the bowl is suspended by the grid bars of the bowl cupola in such a way that, when the feed delivery pipe is lowered, the bowl comes to rest on the floor of the coop, wherein the outer cylinder is guided in a rotatable manner as well as in a raisable and lowerable manner on the inner cylinder, and at least one lifting stop is provided for delimiting a lifting and lowering path of the bowl;

wherein the downpipe includes at least one rotational stop delimiting a rotational path of the outer cylinder in relation to the inner cylinder; and wherein the lifting stop comprises a recess in the cylinder inner surface of the outer cylinder and at least one abutment shoulder for the recess projecting radially from the inner cylinder.

13. A device according to claim 12, wherein:

each abutment shoulder for the recess is a part of a radial projection in a form of a collar flange.

14. A device according to claim 10, wherein: each bridging element is a flat web, of which a web surface plane is aligned radially to the axis of the individual inner cylinder or outer cylinder in each case.

15. A device according to claim 14, wherein:

the bridging elements of the outer cylinder comprise paddles or vanes projecting over a periphery of the outer cylinder into the feed bowl.

16. A device for the feeding of free-range poultry kept in a coop with at least one feed delivery pipe held above a floor of the coop and capable of being raised and lowered, the pipe having at least one aperture, comprising:

a bowl device configured to be suspended on the feed delivery pipe, the bowl device including a feed bowl located beneath a downpipe, the bowl device further including a cupola formed from grid bars in spoke fashion, wherein the downpipe comprises an inner cylinder configured to depart from the aperture and an outer cylinder encompassing the inner cylinder, on which the bowl is suspended by the grid bars of the bowl cupola in such a way that, when the feed delivery pipe is lowered, the bowl comes to rest on the floor of the coop, wherein the outer cylinder is guided in a rotatable manner as well as in a raisable and lowerable manner on the inner cylinder, and at least one lifting stop is provided for delimiting a lifting and lowering path of the bowl;

wherein the downpipe includes at least one rotational stop delimiting a rotational path of the outer cylinder in relation to the inner cylinder; and wherein the feed bowl includes a feed plate, which in an area of its plate edge includes connecting elements for connecting to the bowl cupola.

17. A device according to claim 16, wherein:

free ends of the grid bars of the cupola are connected to a screw ring that surrounds the outer cylinder.

18. A device according to claim 16, wherein:

the connecting elements include a flap joint and at least one locking or retaining element.

19. A device according to claim 16, wherein:

a ring surface of the feed plate runs around a plate center, which is configured to be located beneath the downpipe, and is subdivided into feeding sections.

20. A device according to claim 19, wherein:

each feeding section comprises at least one pocket delimited by depression or elevation.

21. A device for the feeding of free-range poultry kept in a coop with at least one feed delivery pipe held above a floor of the coop and capable of being raised and lowered, the pipe having at least one aperture, comprising:

a bowl device configured to be suspended on the feed delivery pipe, the bowl device including a feed bowl located beneath a downpipe, the bowl device further including a cupola formed from grid bars in spoke fashion, wherein the downpipe comprises an inner cylinder configured to depart from the aperture and an outer cylinder encompassing the inner cylinder, on which the bowl is suspended by the grid bars of the bowl cupola in such a way that, when the feed delivery pipe is lowered, the bowl comes to rest on the floor of the coop, wherein the outer cylinder is guided in a rotatable manner as well as in a raisable and lowerable manner on the inner cylinder, and at least one lifting stop is provided for delimiting a lifting and lowering path of the bowl;

wherein the downpipe includes at least one rotational stop delimiting a rotational path of the outer cylinder in relation to the inner cylinder;

wherein the feed bowl includes a feed plate, which in an area of its plate edge includes connecting elements for connecting to the bowl cupola;

wherein a ring surface of the feed plate runs around a plate center, which is configured to be located beneath the downpipe, and is subdivided into feeding sections;

wherein the outer cylinder is comprised of adjacent outer cylinder sections co-axial to each other, whereby outer face peripheral areas of the outer cylinder sections turned towards each other are connected to one another by outer bridging elements which bridge an outer gap area, which corresponds to an outer interval distance between the outer cylinder sections; and wherein the number of feeding sections is equal to a multiple of the number of the bridging elements of the outer cylinder.

22. A device according to claim 21, wherein:

the bridging elements comprise paddles or vanes.

23. A device for the feeding of free-range poultry kept in a coop with at least one feed delivery pipe held above a floor of the coop and capable of being raised and lowered, the pipe having at least one aperture, comprising:

a bowl device configured to be suspended on the feed delivery pipe, the bowl device comprising a feed bowl, a cupola, and a downpipe;

the feed bowl being located beneath the downpipe; and the cupola being formed from grid bars in a spoke fashion;

wherein the downpipe comprises an inner cylinder configured to depart from the aperture and an outer cylinder encompassing the inner cylinder;

wherein the feed bowl is suspended by the grid bars of the bowl cupola in such a way that, when the feed delivery pipe is lowered, the bowl comes to rest on the floor of the coop;

wherein the outer cylinder is guided in a rotatable manner as well as in a raisable and lowerable manner on the inner cylinder;

wherein the bowl device includes at least one lifting stop for delimiting a lifting and lowering path of the bowl;

wherein the downpipe includes at least one rotational stop delimiting a rotational path of the outer cylinder in relation to the inner cylinder; and wherein the outer cylinder features at least one spring-elastic engagement cam.

24. A device according to claim 23, wherein:

ends of the grid bars of the cupola are connected to a screw ring that surrounds the outer cylinder.

25. A device for the feeding of free-range poultry kept in a coop with at least one feed delivery pipe held above a floor of the coop and capable of being raised and lowered, the pipe having at least one aperture, comprising:

a bowl device configured to be suspended on the feed delivery pipe, the bowl device comprising a feed bowl, a cupola, and a downpipe;

the feed bowl being located beneath the downpipe; and the cupola being formed from grid bars in a spoke fashion;

wherein the downpipe comprises an inner cylinder configured to depart from the aperture and an outer cylinder encompassing the inner cylinder;

wherein the feed bowl is suspended by the grid bars of the bowl cupola in such a way that, when the feed delivery pipe is lowered, the bowl comes to rest on the floor of the coop;

wherein the outer cylinder is guided in a rotatable manner as well as in a raisable and lowerable manner on the inner cylinder;

wherein the bowl device includes at least one lifting stop for delimiting a lifting and lowering path of the bowl;

wherein the downpipe includes at least one rotational stop delimiting a rotational path of the outer cylinder in relation to the inner cylinder;

wherein each rotational stop includes at least one elevation and at least one driver dog;

wherein the at least one elevation is arranged in a predetermined area of the outer surface of the inner cylinder;

wherein the at least one driver dog is located on an inner surface of the outer cylinder; and wherein the at least one driver dog includes a rotational path of which, at the rotation of the outer cylinder about the inner cylinder, the elevation projects.

26. A device according to claim 25, wherein:

a predetermined area of the outer surface of the inner cylinder at an upper head part includes a reduced cylinder diameter compared to a remaining portion of the inner cylinder; and the predetermined area is offset in relation to a remaining portion of the inner cylinder as a result of reduced cylinder diameter.

27. A device for the feeding of free-range poultry kept in a coop with at least one feed delivery pipe held above a floor of the coop and capable of being raised and lowered, the pipe having at least one aperture, comprising:

a bowl device configured to be suspended on the feed delivery pipe, the bowl device comprising a feed bowl, a cupola, and a downpipe;

the feed bowl being located beneath the downpipe; and the cupola being formed from grid bars in a spoke fashion;

wherein the downpipe comprises an inner cylinder configured to depart from the aperture and an outer cylinder encompassing the inner cylinder;

wherein the feed bowl is suspended by the grid bars of the bowl cupola in such a way that, when the feed delivery pipe is lowered, the bowl comes to rest on the floor of the coop;

wherein the outer cylinder is guided in a rotatable manner as well as in a raisable and lowerable manner on the inner cylinder;

wherein the bowl device includes at least one lifting stop for delimiting a lifting and lowering path of the bowl;

wherein the downpipe includes at least one rotational stop delimiting a rotational path of the outer cylinder in relation to the inner cylinder;

the outer surface of an upper cylinder section of the outer cylinder includes a threaded spindle; and ends of the grid bars of the bowl cupola are connected to a screw ring, which is screwed onto an area of the outer cylinder having the threaded spindle.

28. A device according to claim 27, wherein:

the outer cylinder features at least one spring-elastic engagement cam in an area defined by the threaded spindle.

29. A device according to claim 28, wherein:

each engagement cam is spring-elastic in a radial direction.

30. A device according to claim 28, wherein:

the screw ring includes cut-outs on an inner circumference surface thereof; and the cut-outs are capable of engaging the engagement cams with a positive fit.

31. A device for the feeding of free-range poultry kept in a coop with at least one feed delivery pipe held above a floor of the coop and capable of being raised and lowered, the pipe having at least one aperture, comprising:

a bowl device configured to be suspended on the feed delivery pipe, the bowl device comprising a feed bowl, a cupola, and a downpipe;

the feed bowl being locate beneath the downpipe; and the cupola being from rid bars in a spoke fashion;

wherein the downpipe comprises an inner cylinder configured to depart from the aperture and an outer cylinder encompassing the inner cylinder;

wherein the feed bowl is suspended b the rid bars of the bowl cupola in. such a way that, when the feed delivery pipe is lowered, the bowl comes to rest on the floor of the coop;

wherein the outer cylinder is guided in a rotatable manner as well as in a raisable and lowerable manner on the inner cylinder;

wherein the bowl device includes at least one lifting stop for delimiting a lifting and lowering of the bowl;

wherein the downpipe includes at least one rotational stop delimiting a rotational path of the outer cylinder in relation to the inner cylinder;

wherein the outer surface of an upper cylinder section of the outer cylinder includes a threaded spindle;

wherein ends of the rid bars of the bowl cupola are connected to a screw ring which is screwed onto an area of the outer cylinder having the threaded spindle;

wherein the outer c under features at least one spring-elastic engagement cam in an area defined by the threaded spindle;

wherein the screw ring includes cut-outs on an inner circumference surface thereof;

wherein the cut-outs are capable of engaging the engagement cam with a positive fit; and wherein the engagement cams and the cut-outs include run-in flanks arranged obliquely to a direction of rotation.

32. A device for the feeding of free-range poultry kept in a coop with at least one feed delivery pipe held above a floor of the coop and capable of being raised and lowered, the pipe having at least one aperture, comprising:

a bowl device configured to be suspended on the feed delivery pipe, the bowl device comprising a feed bowl, a cupola, and a downpipe;

the feed bowl being located beneath the downpipe; and the cupola being formed from grid bars in a spoke fashion;

wherein the downpipe comprises an inner cylinder configured to depart from the aperture and an outer cylinder encompassing the inner cylinder;

wherein the feed bowl is suspended by the grid bars of the bowl cupola in such a way that, when the feed delivery pipe is lowered, the bowl comes to rest on the floor of the coop;

wherein the outer cylinder is guided in a rotatable manner as well as in a raisable and lowerable manner on the inner cylinder;

wherein the bowl device includes at least one lifting stop for delimiting a lifting and lowering path of the bowl;

wherein the downpipe includes at least one rotational stop delimiting a rotational path of the outer cylinder in relation to the inner cylinder;

wherein the outer cylinder is comprised of adjacent outer cylinder sections co-axial to each other, whereby outer face peripheral areas of the outer cylinder sections turned towards each other are connected to one another by outer bridging elements which bridge an outer gap area, which corresponds to an outer interval distance between the outer cylinder sections; and wherein the inner cylinder is comprised of adjacent inner cylinder sections co-axial to each other, whereby inner face peripheral areas of the inner cylinder sections turned towards each other are connected to one another by inner bridging elements which bridge an inner gap area, which corresponds to an inner interval distance between the inner cylinder sections.

33. A device for the feeding of free-range poultry kept in a coop with at least one feed delivery pipe held above a floor of the coop and capable of being raised and lowered, the pipe having at least one aperture, comprising:

a bowl device configured to be suspended on the feed delivery pipe, the bowl device comprising a feed bowl, a cupola, and a downpipe;

the feed bowl being located beneath the downpipe; and the cupola being formed from grid bars in a spoke fashion;

wherein the downpipe comprises an inner cylinder configured to depart from the aperture and an outer cylinder encompassing the inner cylinder;

wherein the feed bowl is suspended by the grid bars of the bowl cupola in such a way that, when the feed delivery pipe is lowered, the bowl comes to rest on the floor of the coop;

wherein the outer cylinder is guided in a rotatable manner as well as in a raisable and lowerable manner on the inner cylinder;

wherein the bowl device includes at least one lifting stop for delimiting a lifting and lowering path of the bowl; and wherein the downpipe includes at least one rotational stop delimiting a rotational path of the outer cylinder in relation to the inner cylinder;

wherein an end-side cylinder section of the inner cylinder covers a gap area between the outer cylinder sections of the outer cylinder when the outer cylinder is moved by the raising of the feed delivery pipe into a position which is lowered in relation to the inner cylinder;

wherein the inner cylinder and the outer cylinder each include one of the at least one lifting stop; and wherein the lifting stops of the inner cylinder and the outer cylinder are in mutually opposed positions.

34. A device for the feeding of free-range poultry kept in a coop with at least one feed delivery pipe held above a floor of the coop and capable of being raised and lowered, the pipe having at least one aperture, comprising:

a bowl device configured to be suspended on the feed delivery pipe, the bowl device comprising a feed bowl, a cupola, and a downpipe;

the feed bowl being located beneath the downpipe; and the cupola being formed from grid bars in a spoke fashion;

wherein the downpipe comprises an inner cylinder configured to depart from the aperture and an outer cylinder encompassing the inner cylinder;

wherein the feed bowl is suspended by the grid bars of the bowl cupola in such a way that, when the feed delivery pipe is lowered, the bowl comes to rest on the floor of the coop;

wherein the outer cylinder is guided in a rotatable manner as well as in a raisable and lowerable manner on the inner cylinder;

wherein the bowl device includes at least one lifting stop for delimiting a lifting and lowering path of the bowl;

wherein the downpipe includes at least one rotational stop delimiting a rotational path of the outer cylinder in relation to the inner cylinder; and wherein the at least one lifting stop comprises a recess in a cylinder inner surface of the outer cylinder and at least one abutment shoulder for the recess projecting radially from the inner cylinder.

35. A device according to claim 34, wherein:
each abutment shoulder for the recess is a part of a radial projection.

36. A device according to claim 32, wherein:
each bridging element is a flat web, of which a web surface plane is aligned radially to an axis of the individual inner cylinder or outer cylinder in each case.

37. A device according to claim 36, wherein:
the bridging elements of the outer cylinder comprise paddles or vanes projecting over a periphery of the outer cylinder.

38. A device for the feeding of free-range poultry kept in a coop with at least one feed delivery pipe held above a floor of the coop and capable of being raised and lowered, the pipe having at least one aperture, comprising:

a bowl device configured to be suspended on the feed delivery pipe, the bowl device comprising a feed bowl, a cupola, and a downpipe;

the feed bowl being located beneath the downpipe; and the cupola being formed from grid bars in a spoke fashion;

wherein the downpipe comprises an inner cylinder configured to depart from the aperture and an outer cylinder encompassing the inner cylinder;

wherein the feed bowl is suspended by the grid bars of the bowl cupola in such a way that, when the feed delivery pipe is lowered, the bowl comes to rest on the floor of the coop;

wherein the outer cylinder is guided in a rotatable manner as well as in a raisable and lowerable manner on the inner cylinder;

wherein the bowl device includes at least one lifting stop for delimiting a lifting and lowering path of the bowl;

wherein the downpipe includes at least one rotational stop delimiting a rotational path of the outer cylinder in relation to the inner cylinder;

wherein the feed bowl includes a feed plate; and wherein the feed plate includes a plate edge having connecting elements for connecting the feed plate to the bowl cupola.

39. A device according to claim 38, wherein:
ends of the grid bars of the cupola are connected to a screw ring that surrounds the outer cylinder.

40. A device according to claim 38, wherein:
the connecting elements include a flap joint and at least one locking or retaining element.

41. A device according to claim 38, wherein:
the feed plate includes a ring surface configured to be located beneath the downpipe and a plate center;
the ring surface surrounds the plate center; and
the ring surface is subdivided into feeding sections.

42. A device according to claim 41, wherein:
each feeding section comprises at least one pocket delimited by depression or elevation.

43. A device for the feeding of free-range poultry kept in a coop with at least one feed delivery pipe held above a floor of the coop and capable of being raised and lowered, the pipe having at least one aperture, comprising:

a bowl device configured to be suspended on the feed delivery pipe, the bowl device comprising a feed bowl, a cupola, and a downpipe;

the feed bowl being located beneath the downpipe; and the cupola being formed from grid bars in a spoke fashion;

wherein the downpipe comprises an inner cylinder configured to depart from the aperture and an outer cylinder encompassing the inner cylinder;

wherein the feed bowl is suspended by the grid bars of the bowl cupola in such a way that, when the feed delivery pipe is lowered, the bowl comes to rest on the floor of the coop;

wherein the outer cylinder is guided in a rotatable manner as well as in a raisable and lowerable manner on the inner cylinder;

wherein the bowl device includes at least one lifting stop for delimiting a lifting and lowering path of the bowl;

wherein the downpipe includes at least one rotational stop delimiting a rotational path of the outer cylinder in relation to the inner cylinder;

wherein the feed bowl includes a feed plate;

wherein the feed plate includes a plate edge having connecting elements for connecting the feed plate to the bowl cupola;

wherein the feed plate includes a ring surface configured to be located beneath the downpipe and a plate center;

wherein the ring surface surrounds the plate center;

wherein the ring surface is subdivided into feeding sections;

wherein the outer cylinder is comprised of adjacent outer cylinder sections co-axial to each other, whereby outer face peripheral areas of the outer cylinder sections turned towards each other are connected to one another by outer bridging elements which bridge an outer gap area, which corresponds to an outer interval distance between the outer cylinder sections; and wherein the number of feeding sections is equal to a multiple of the number of the bridging elements of the outer cylinder.

44. A device according to claim 43, wherein:

the bridging elements comprise paddles or vanes.

45. A feeding system for the feeding of free-range poultry kept in a coop comprising:

at least one feed delivery pipe held above a floor of the coop and capable of being raised and lowered, the pipe having at least one branch aperture; and a bowl device suspended on the feed delivery pipe and in connection with one of the at least one branch aperture, the bowl device comprising a feed bowl, a cupola, and a downpipe;

the feed bowl being located beneath the downpipe; and the cupola being formed from grid bars in a spoke fashion;

wherein the downpipe comprises an inner cylinder departing from the aperture and an outer cylinder encompassing the inner cylinder;

wherein the feed bowl is suspended by the grid bars of the bowl cupola in such a way that, when the feed delivery pipe is lowered, the bowl comes to rest on the floor of the coop;

wherein the outer cylinder is guided in a rotatable manner as well as in a raisable and lowerable manner on the inner cylinder;

wherein the bowl device includes at least one lifting stop for delimiting a lifting and lowering path of the bowl;

wherein the downpipe includes at least one rotational stop delimiting a rotational path of the outer cylinder in relation to the inner cylinder; and wherein the outer cylinder features at least one spring-elastic engagement cam.

46. A device according to claim 45, wherein:

ends of the grid bars of the cupola are connected to a screw ring that surrounds the outer cylinder.

47. A feeding system for the feeding of free-range poultry kept in a coop comprising:

at least one feed delivery pipe held above a floor of the coop and capable of being raised and lowered, the pipe having at least one branch aperture; and a bowl device suspended on the feed delivery pipe and in connection with one of the at least one branch aperture, the bowl device comprising a feed bowl, a cupola, and a downpipe;

the feed bowl being located beneath the downpipe; and the cupola being formed from grid bars in a spoke fashion;

wherein the downpipe comprises an inner cylinder departing from the aperture and an outer cylinder encompassing the inner cylinder;

wherein the feed bowl is suspended by the grid bars of the bowl cupola in such a way that, when the feed delivery pipe is lowered, the bowl comes to rest on the floor of the coop;

wherein the outer cylinder is guided in a rotatable manner as well as in a raisable and lowerable manner on the inner cylinder;

wherein the bowl device includes at least one lifting stop for delimiting a lifting and lowering path of the bowl;

wherein the downpipe includes at least one rotational stop delimiting a rotational path of the outer cylinder in relation to the inner cylinder;

wherein each rotational stop includes at least one elevation and at least one driver dog;

wherein the at least one elevation is arranged in a predetermined area of the outer surface of the inner cylinder;

wherein the at least one driver dog is located on an inner surface of the outer cylinder; and wherein the at least one driver dog includes a rotational path of which, at the rotation of the outer cylinder about the inner cylinder, the elevation projects.

48. A feeding system according to claim 47, wherein:

a predetermined area of the outer surface of the inner cylinder at an upper head part includes a reduced cylinder diameter compared to a remaining portion of the inner cylinder; and the predetermined area is offset in relation to a remaining portion of the inner cylinder as a result of reduced cylinder diameter.

49. A feeding system for the feeding of free-range poultry kept in a coop comprising:

at least one feed delivery pipe held above a floor of the coop and capable of being raised and lowered, the pipe having at least one branch aperture; and a bowl device suspended on the feed delivery pipe and in connection with one of the at least one branch aperture, the bowl device comprising a feed bowl, a cupola, and a downpipe;

the feed bowl being located beneath the downpipe; and the cupola being formed from grid bars in a spoke fashion;

wherein the downpipe comprises an inner cylinder departing from the aperture and an outer cylinder encompassing the inner cylinder;

wherein the feed bowl is suspended by the grid bars of the bowl cupola in such a way that, when the feed delivery pipe is lowered, the bowl comes to rest on the floor of the coop;

wherein the outer cylinder is guided in a rotatable manner as well as in a raisable and lowerable manner on the inner cylinder;

wherein the bowl device includes at least one lifting stop for delimiting a lifting and lowering path of the bowl;

wherein the downpipe includes at least one rotational stop delimiting a rotational path of the outer cylinder in relation to the inner cylinder;

wherein the outer surface of an upper cylinder section of the outer cylinder includes a threaded spindle; and wherein ends of the grid bars of the bowl cupola are connected to a screw ring, which is screwed onto an area of the outer cylinder having the threaded spindle.

50. A feeding system according to claim 49, wherein:

the outer cylinder features at least one spring-elastic engagement cam in an area defined by the threaded spindle.

51. A feeding system according to claim 50, wherein:

each engagement cam is spring-elastic in a radial direction.

52. A feeding system according to claim 50, wherein:

the screw ring includes cut-outs on an inner circumference surface thereof; and the cut-outs are capable of engaging the engagement cams with a positive fit.

53. A feeding system for the feeding of free-range poultry kept in a coop comprising:

at least one feed delivery pipe held above a floor of the coop and capable of being raised and lowered, the pipe having at least one branch aperture; and a bowl device suspended on the feed delivery pipe and in connection with one of the at least one branch aperture, the bowl device comprising a feed bowl, a cupola, and a downpipe;

the feed bowl being located beneath the downpipe; and
the cupola being formed from grid bars in a spoke fashion;
wherein the downpipe comprises cylinder departing from the aperture and an outer cylinder encompassing the inner cylinder;
wherein the feed bowl is suspended b the rid bars of the bowl cupola in such a way that, when the feed delivery pipe is lowered, the bowl comes to rest on the floor of the coop;
wherein the outer c under is guided in a rotatable manner as well as in a raisable and lowerable manner on the inner cylinder;
wherein the bowl device includes at least one lifting stop for delimiting a lifting and lowering path of the bowl;
wherein the downpipe includes at least one rotational stop delimiting a rotational path of the outer cylinder in relation to the inner cylinder;
wherein the outer surface of an upper cylinder section of the outer cylinder includes a threaded spindle;
wherein ends of the grid bars of the bowl cupola are connected to a screw ring which is screwed onto an area of the outer cylinder having the threaded spindle;
wherein the outer cylinder features at least one spring-elastic engagement cam in an area defined by the threaded spindle;
wherein the screw ring includes cut-outs on an inner circumference surface thereof;
wherein the cut-outs are capable of engaging the engagement cams with a positive fit; and
wherein the engagement cams and the cut-outs include run-in flanks arranged obliquely to a direction of rotation.

54. A feeding system for the feeding of free-range poultry kept in a coop comprising:
at least one feed delivery pipe held above a floor of the coop and capable of being raised and lowered, the pipe having at least one branch aperture; and
a bowl device suspended on the feed delivery pipe and in connection with one of the at least one branch aperture, the bowl device comprising a feed bowl, a cupola, and a downpipe;
the feed bowl being located beneath the downpipe; and
the cupola being formed from grid bars in a spoke fashion;
wherein the downpipe comprises an inner cylinder departing from the aperture and an outer cylinder encompassing the inner cylinder;
wherein the feed bowl is suspended by the grid bars of the bowl cupola in such a way that, when the feed delivery pipe is lowered, the bowl comes to rest on the floor of the coop;
wherein the outer cylinder is guided in a rotatable manner as well as in a raisable and lowerable manner on the inner cylinder;
wherein the bowl device includes at least one lifting stop for delimiting a lifting and lowering path of the bowl;
wherein the downpipe includes at least one rotational stop delimiting a rotational path of the outer cylinder in relation to the inner cylinder;
wherein the outer cylinder is comprised of adjacent outer cylinder sections co-axial to each other, whereby outer face peripheral areas of the outer cylinder sections turned towards each other are connected to one another by outer bridging elements which bridge an outer gap area, which corresponds to an outer interval distance between the outer cylinder sections; and
wherein the inner cylinder is comprised of adjacent inner cylinder sections co-axial to each other, whereby inner face peripheral areas of the inner cylinder sections turned towards each other are connected to one another by inner bridging elements which bridge an inner gap area, which corresponds to an inner interval distance between the inner cylinder sections.

55. A feeding system for the feeding of free-range poultry kept in a coop comprising:
at least one feed delivery pipe held above a floor of the coop and capable of being raised and lowered, the pipe having at least one branch aperture; and
a bowl device suspended on the feed delivery pipe and in connection with one of the at least one branch aperture, the bowl device comprising a feed bowl, a cupola, and a downpipe;
the feed bowl being located beneath the downpipe; and
the cupola being formed from grid bars in a spoke fashion;
wherein the downpipe comprises an inner cylinder departing from the aperture and an outer cylinder encompassing the inner cylinder;
wherein the feed bowl is suspended by the grid bars of the bowl cupola in such a way that, when the feed delivery pipe is lowered, the bowl comes to rest on the floor of the coop;
wherein the outer cylinder is guided in a rotatable manner as well as in a raisable and lowerable manner on the inner cylinder;
wherein the bowl device includes at least one lifting stop for delimiting a lifting and lowering path of the bowl;
wherein the downpipe includes at least one rotational stop delimiting a rotational path of the outer cylinder in relation to the inner cylinder;
wherein an end-side cylinder section of the inner cylinder covers a gap area between the outer cylinder sections of the outer cylinder when the outer cylinder is moved by the raising of the feed delivery pipe into a position which is lowered in relation to the inner cylinder;
wherein the inner cylinder and the outer cylinder each include one of the at least one lifting stop; and
wherein the lifting stops of the inner cylinder and the outer cylinder are in mutually opposed positions.

56. A feeding system for the feeding of free-range poultry kept in a coop comprising:
at least one feed delivery pipe held above a floor of the coop and capable of being raised and lowered, the pipe having at least one branch aperture; and
a bowl device suspended on the feed delivery pipe and in connection with one of the at least one branch aperture, the bowl device comprising a feed bowl, a cupola, and a downpipe;
the feed bowl being located beneath the downpipe; and
the cupola being formed from grid bars in a spoke fashion;
wherein the downpipe comprises an inner cylinder departing from the aperture and an outer cylinder encompassing the inner cylinder;
wherein the feed bowl is suspended by the grid bars of the bowl cupola in such a way that, when the feed delivery pipe is lowered, the bowl comes to rest on the floor of the coop;
wherein the outer cylinder is guided in a rotatable manner as well as in a raisable and lowerable manner on the inner cylinder;
wherein the bowl device includes at least one lifting stop for delimiting a lifting and lowering path of the bowl;
wherein the downpipe includes at least one rotational stop delimiting a rotational path of the outer cylinder in relation to the inner cylinder; and wherein the at least one lifting stop comprises a recess in a cylinder inner surface of the outer cylinder and at least one abutment shoulder for the recess projecting radially from the inner cylinder.

57. A feeding system according to claim 56, wherein:
each abutment shoulder for the recess is a part of a radial projection.

58. A feeding system according to claim 54, wherein:
each bridging element is a flat web, of which a web surface plane is aligned radially to an axis of the individual inner cylinder or outer cylinder in each case.

59. A feeding system according to claim 58, wherein: the bridging elements of the outer cylinder comprise paddles or vanes projecting over a periphery of the outer cylinder.

60. A feeding system for the feeding of free-range poultry kept in a coop comprising:
    at least one feed delivery pipe held above a floor of the coop and capable of being raised and lowered, the pipe having at least one branch aperture; and
    a bowl device suspended on the feed delivery pipe and in connection with one of the at least one branch aperture, the bowl device comprising a feed bowl, a cupola, and a downpipe;
    the feed bowl being located beneath the downpipe;
    the cupola being formed from grid bars in a spoke fashion; and
    wherein the downpipe comprises an inner cylinder departing from the aperture and an outer cylinder encompassing the inner cylinder;
    wherein the feed bowl is suspended by the grid bars of the bowl cupola in such a way that, when the feed delivery pipe is lowered, the bowl comes to rest on the floor of the coop;
    wherein the outer cylinder is guided in a rotatable manner as well as in a raisable and lowerable manner on the inner cylinder;
    wherein the bowl device includes at least one lifting stop for delimiting a lifting and lowering path of the bowl;
    wherein the downpipe includes at least one rotational stop delimiting a rotational path of the outer cylinder in relation to the inner cylinder;
    wherein the feed bowl includes a feed plate; and
    wherein the feed plate includes a plate edge having connecting elements for connecting the feed plate to the bowl cupola.

61. A device according to claim 60, wherein:
ends of the grid bars of the cupola are connected to a screw ring that surrounds the outer cylinder.

62. A feeding system according to claim 60, wherein:
the connecting elements include a flap joint and at least one locking or retaining element.

63. A feeding system according to claim 60, wherein:
the feed plate includes a ring surface configured to be located beneath the downpipe and a plate center;
the ring surface surrounds the plate center; and
the ring surface is subdivided into feeding sections.

64. A feeding system according to claim 63, wherein:
each feeding section comprises at least one pocket delimited by depression or elevation.

65. A feeding system the feeding of free-range poultry kept in a coop comprising:
    at least one feed delivery pipe held above a floor of the coop and capable of being raised and lowered, the pipe having at one branch aperture; and
    a bowl device suspended on the feed deliver pipe and in connection with one of the at least one branch aperture, the bowl device comprising a feed bowl, a cupola, and a downpipe;
    the feed bowl being located beneath the downpipe; and
    the cupola being formed from grid bars in a spoke fashion;
    wherein the downpipe comprises an inner cylinder departing from the aperture and an outer cylinder encompassing the inner cylinder;
    wherein the feed bowl is suspended b the rid bars of the bowl cupola in such a way that, when the feed delivery pipe is lowered, the bowl comes to rest on the floor of the coop;
    wherein the outer cylinder is guided in a rotatable manner as well as in a raisable and lowerable manner on the inner cylinder;
    wherein the bowl device includes at least one lifting stop for delimiting a lifting and lowering path of the bowl;
    wherein the downpipe includes at least one rotational stop delimiting a rotational path of the outer cylinder in relation to the inner cylinder;
    wherein the feed bowl includes a feed plate;
    wherein the plate includes a plate edge having connecting elements for connecting the feed plate to the bowl cupola;
    wherein the feed plate includes a ring surface configured to be located beneath the downpipe and a plate center;
    wherein the ring surface surrounds the late center;
    wherein the ring surface is subdivided into feeding sections;
    wherein the outer cylinder is comprised of adjacent outer cylinder sections co-axial to each other, whereby outer face peripheral areas of the outer cylinder sections turned towards each other are connected to one another by outer bridging elements which bridge an outer gap area, which corresponds to an outer interval distance between the outer cylinder sections; and
    wherein the number of feeding sections is equal to a multiple of the number of the bridging elements of the outer cylinder.

66. A feeding system according to claim 65, wherein:
the bridging elements comprise paddles or vanes.

* * * * *

UNITED STATES PATENT AND TRADEMARK OFFICE
CERTIFICATE OF CORRECTION

PATENT NO.      : 7,552,697 B2
APPLICATION NO. : 10/500078
DATED           : June 30, 2009
INVENTOR(S)     : Roland Busse It is certified that error appears in the above-identified patent and that said Letters Patent is hereby corrected as shown below:

Column 12
Line 43, "claim 5" should be --claim 6--.
Line 58, "b the rid bars" should be --by the grid bars--.

Column 15
Line 8, omit "free" before "ends".

Column 17
Line 46, "being from rid bars" should be --being formed from grid bars--.
Line 50, "b the rid" should be --by the grid--.
Line 51, omit "." after "in".
Line 59, "lowering of the bowl" should be --lowering path of the bowl--.
Line 65, "ends of the rid bars" should be --ends of the grid bars--.
Line 66, "screw ring which" should be --screw ring, which--.

Column 18
Line 1, "c under" should be --cylinder--.

Column 23
Line 6, "b the rid bars" should be --by the grid bars--.
Line 10, "c under" should be --cylinder--.
Line 21, "screw ring which" should be --screw ring, which--.

UNITED STATES PATENT AND TRADEMARK OFFICE
CERTIFICATE OF CORRECTION

PATENT NO. : 7,552,697 B2
APPLICATION NO. : 10/500078
DATED : June 30, 2009
INVENTOR(S) : Roland Busse It is certified that error appears in the above-identified patent and that said Letters Patent is hereby corrected as shown below:

Column 26
Line 6, insert --for-- after "system".
Line 10, insert --least-- after "at".
Line 11, "deliver" should be --delivery--.
Line 20, "b the rid bars" should be --by the grid bars--.
Line 33, "the plate includes" should be --the feed plate includes--.
Line 38, "the late center" should be --the plate center--.

Signed and Sealed this

Seventeenth Day of November, 2009

David J. Kappos
*Director of the United States Patent and Trademark Office*